(12) United States Patent
Bortoff et al.

(10) Patent No.: US 10,591,915 B2
(45) Date of Patent: Mar. 17, 2020

(54) MOTION CONTROLLER FOR REAL-TIME CONTINUOUS CURVATURE PATH PLANNING

(71) Applicant: Mitsubishi Electric Research Laboratories, Inc., Cambridge, MA (US)

(72) Inventors: Scott A Bortoff, Brookline, MA (US); Yebin Wang, Cambridge, MA (US); Jin Dai, Notre Dame, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 89 days.

(21) Appl. No.: 15/667,734

(22) Filed: Aug. 3, 2017

(65) Prior Publication Data
US 2019/0041858 A1  Feb. 7, 2019

(51) Int. Cl.
*G05D 1/02* (2020.01)
*B60W 50/00* (2006.01)
(Continued)

(52) U.S. Cl.
CPC .......... *G05D 1/0212* (2013.01); *B60W 10/20* (2013.01); *B60W 30/06* (2013.01);
(Continued)

(58) Field of Classification Search
CPC .... G05D 1/0212; G05D 1/0088; G05D 1/024; G05D 1/0246; B60W 10/20;
(Continued)

(56) References Cited

U.S. PATENT DOCUMENTS 5,109,340 A * 4/1992 Kanayama ........... G05D 1/0212
                                                      701/25
7,737,866 B2  6/2010 Wu et al.
(Continued)

OTHER PUBLICATIONS

J.A. Reeds and L.A. Shepp "Optimal Paths For A Car That Goes Both Forwards and Backwards", Pacific Journal of Mathematics vol. 145 No. 2, all pages, retrieved from https://projecteuclid.org/download/pdf_1/euclid.pjm/1102645450 (Year: 1990).*

(Continued)

*Primary Examiner* — Calvin Cheung
(74) *Attorney, Agent, or Firm* — Gennadiy Vinokur; James McAleenan; Hironori Tsukamoto

(57) ABSTRACT

A system for controlling a motion of a vehicle from an initial state to a target state includes a path planner to determine a discontinuous curvature path connecting the initial state with the target state by a sequential composition of driving patterns. The discontinuous curvature path is collision-free within a tolerance envelope centered on the discontinuous curvature path. The system further includes a path transformer to locate and replace at least one treatable primitive in the discontinuous curvature path with a corresponding continuous curvature segment to form a modified path remaining within the tolerance envelope. Each treatable primitive is a predetermined pattern of elementary paths. The system further includes a controller to control the motion of the vehicle according to the modified path.

16 Claims, 43 Drawing Sheets

(51) Int. Cl.
  *B62D 15/02* (2006.01)
  *B60W 10/20* (2006.01)
  *B60W 30/06* (2006.01)
  *G05D 1/00* (2006.01)
  *B60W 50/06* (2006.01)

(52) U.S. Cl.
  CPC ..... *B60W 50/0098* (2013.01); *B62D 15/0285* (2013.01); *G05D 1/0088* (2013.01); *G05D 1/024* (2013.01); *G05D 1/0246* (2013.01); *B60K 2370/175* (2019.05); *B60W 2050/0002* (2013.01); *B60W 2050/0013* (2013.01); *B60W 2050/0018* (2013.01); *B60W 2050/0034* (2013.01); *B60W 2050/065* (2013.01)

(58) Field of Classification Search
  CPC ............. B60W 30/06; B60W 50/0098; B60W 2050/0002; B60W 2050/0013; B60W 2050/0018; B60W 2050/0034; B60W 2050/065; B62D 15/0285
  See application file for complete search history.

(56) References Cited

U.S. PATENT DOCUMENTS

| | | | |
|---|---|---|---|
| 8,428,820 B2 | 4/2013 | Ottenhues et al. | |
| 8,497,782 B2 | 7/2013 | Barth et al. | |
| 8,700,307 B1* | 4/2014 | Zhao | B25J 9/1666 701/301 |
| 8,862,321 B2 | 10/2014 | Moshchuck et al. | |
| 2010/0299013 A1* | 11/2010 | Dolgov | G05D 1/0274 701/25 |
| 2013/0313373 A1 | 11/2013 | O'Dell | |
| 2016/0307342 A1* | 10/2016 | Lee | G06T 11/203 |
| 2016/0313737 A1* | 10/2016 | Berkemeier | G05D 1/0212 |
| 2017/0293304 A1* | 10/2017 | Dang | A01B 69/008 |
| 2018/0284769 A1* | 10/2018 | Wang | B60W 30/06 |
| 2018/0284782 A1* | 10/2018 | Kalabic | B60W 30/06 |

OTHER PUBLICATIONS

Fraichard et al., "From Reeds and Shepps to Continuous Curvature Paths," IEEE Transactions on Robotics., vol. 20, No. 6. Dec. 1, 2004. pp. 1025-1035, XP055466529, US.

Muller et al., "Continuous Curvature Trajectory Design and Feedforward Control for Parking a Car," IEEE Transactions on Control Systems Technology, vol. 15, No. 3, May 1, 2007. pp. 541-553, XP055466566. US.

Scheuren et al., "Prozessoptimierte Planung fur kooperative mobile roboter," Universitat Osnabruck—dissertation, Mar. 1, 2014. Retrieved from the internet: https://repositorium.ub.uni-osnabrueck.de/handle/urn:nbn:de:gbv:700-2014070812619. retrieved Apr. 12, 2018.

Dai et al., "On Existance Conditions of a Class of Continuous Curvature Paths," 2017 36th Chinese Control Conference, Jul. 1, 2017, pp. 6773-6780, XP055466558.

L. Kavraki, P. Svestka, J.-C. Latombe, and M. Overmars, "Probabilistic roadmaps for path planning in high-dimensional configuration spaces," IEEE Trans. Robot. Automat., vol. 12, No. 4, pp. 566-580, Aug. 1996.

E. Bakolas and P. Tsiotras, "On the generation of nearly optimal, planar paths of bounded curvature and bounded curvature gradient," in Proc. 2009 ACC, Jun. 2009, pp. 385-390.

J. Dai and Y.Wang, "Existence conditions of a class of continuous curvature paths," in the 36th Chinese Control Conf., Jul. 26-28, 2017. Dalian China.

T. Fraichard and A. Scheuer, "From Reeds and Shepp's to continuous curvature paths," IEEE Trans. Robot., vol. 20, No. 6, pp. 1025-1035, Dec. 2004.

H. J. Sussmann, "The markov-dubins problem with angular acceleration control," in Proc. 1997 ICRA, May 1997, pp. 2636-2643.

J.-P. Laumond, P. E Jacobs, M. Taïx, and R. M. Murray, "A motion planner for nonholonomic mobile robots," IEEE Trans. Robot. Automat., vol. 10, No. 5, pp. 577-593, Oct. 1994.

J. A. Reeds and L. A. Shepp, "Optimal paths for a car that goes both forwards and backwards," Pacific Journal of Mathematics, vol. 145, No. 2, pp. 367-393, 1990.

G. E. Fainekos, A. Girard, H. Kress-Gazit, and G. J. Pappas, "Temporal logic motion planning for dynamic robots," Automatica, vol. 45, No. 2, pp. 343-352, 2009.

\* cited by examiner

| Classes | Patterns |
|---|---|
| $CSC-1$ | L+S+L+, L-S-L-, R+S+R+, R-S-R- |
| $CSC-2$ | L+S+R+, L-S-R-, R+S+L+, R-S-L- |
| $C\|C\|C$ | L+R-L, L-R+L+, R+L-R+, R-L+R- |
| $C\|CC$ | L+R-L, L-R+L+, R+L-R-, R-L+R+ |
| $CC\|C$ | L+R+L, L-R-L+, R+L+R-, R-L-R+ |
| $CC_uC_uC$ | L+R+L-R-, L-R-L+R+, R+L+R-L-, R-L-R+L+ |
| $C\|C_uC_u\|C$ | L+R-L-R+, L-R+L+R-, R+L-R-L+, R-L+L+R- |
| $C\|C_\frac{\pi}{2}SC-1$ | L+R-S-R-, L-R+S+R+, R+L-S-L-, R-L+S+L+ |
| $C\|C_\frac{\pi}{2}SC-2$ | L+R-S-L-, L-R+S+L+, R+L-S-R-, R-L+S+R+ |
| $CSC_\frac{\pi}{2}\|C-1$ | L+S+L+R-, L-S-L-R+, R+S+R+L-, R-S-R-L+ |
| $CSC_\frac{\pi}{2}\|C-2$ | L+S+R+L-, L-S-R-L+, R+S+L+R-, R-S-L-R+ |
| $C\|C_\frac{\pi}{2}SC_\frac{\pi}{2}\|C$ | L+R-S-L-R+, R+L-S-R-L+ |

FIG. 1C

| Embodiment 1 | Embodiment 2 | Embodiment 3 | Embodiment 4 |
|---|---|---|---|
| $CSC-1$ | $SCSC-1$ | $CSCS-1$ | $SCSCS-1$ |
| $CSC-2$ | $SCSC-2$ | $CSCS-2$ | $SCSCS-2$ |
| $C|C|C$ | $SC|C|C$ | $C|C|CS$ | $SC|C|CS$ |
| $C|CC$ | $SC|CC$ | $C|CCS$ | $SC|CCS$ |
| $CC|C$ | $SCC|C$ | $CC|CS$ | $SCC|CS$ |
| $CC_uC_uC$ | $SCC_uC_uC$ | $CC_uC_uCS$ | $SCC_uC_uCS$ |
| $C|C_uC_u|C$ | $SC|C_uC_u|C$ | $C|C_uC_u|CS$ | $SC|C_uC_u|CS$ |
| $C|C_{\pi}SC-1$ | $SC|C_{\pi}SC-1$ | $C|C_{\pi}SCS-1$ | $SC|C_{\pi}SCS-1$ |
| $C|C_{\pi}SC-2$ | $SC|C_{\pi}SC-2$ | $C|C_{\pi}SCS-2$ | $SC|C_{\pi}SCS-2$ |
| $CSC_{\frac{\pi}{2}}|C-1$ | $SCSC_{\frac{\pi}{2}}|C-1$ | $CSC_{\frac{\pi}{2}}|CS-1$ | $SCSC_{\frac{\pi}{2}}|CS-1$ |
| $CSC_{\frac{\pi}{2}}|C-2$ | $SCSC_{\frac{\pi}{2}}|C-2$ | $CSC_{\frac{\pi}{2}}|CS-2$ | $SCSC_{\frac{\pi}{2}}|CS-2$ |
| $C|C_{\frac{\pi}{2}}SC_{\frac{\pi}{2}}|C$ | $SC|C_{\frac{\pi}{2}}SC_{\frac{\pi}{2}}|C$ | $C|C_{\frac{\pi}{2}}SC_{\frac{\pi}{2}}|CS$ | $SC|C_{\frac{\pi}{2}}SC_{\frac{\pi}{2}}|CS$ |

FIG. 3B

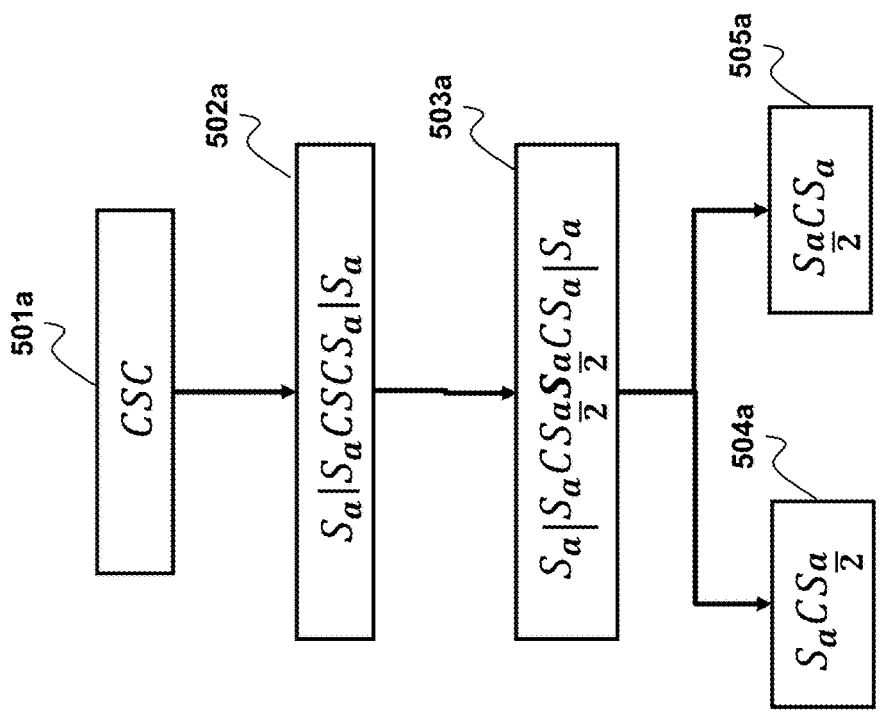
FIG. 5A1

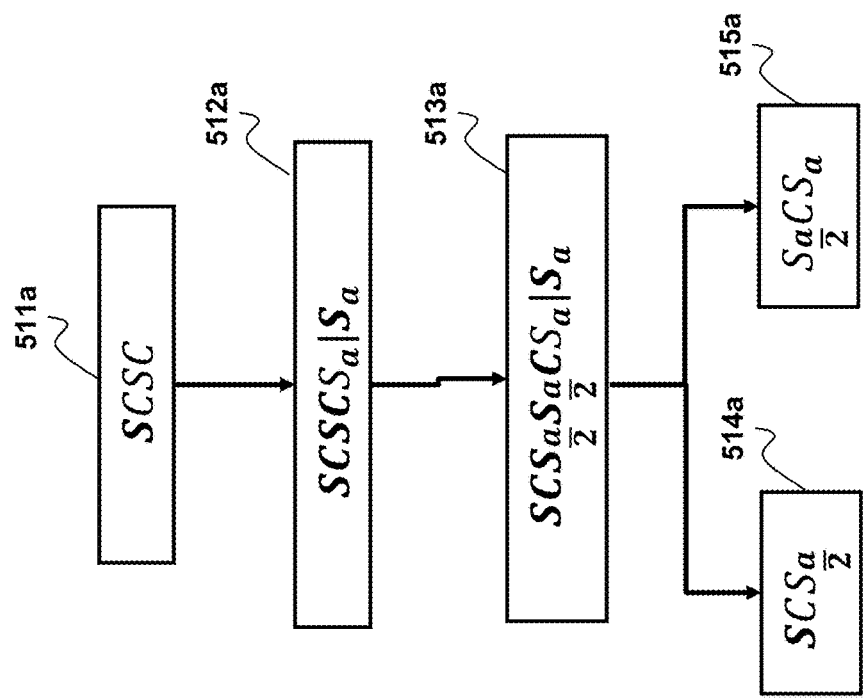
FIG. 5A2

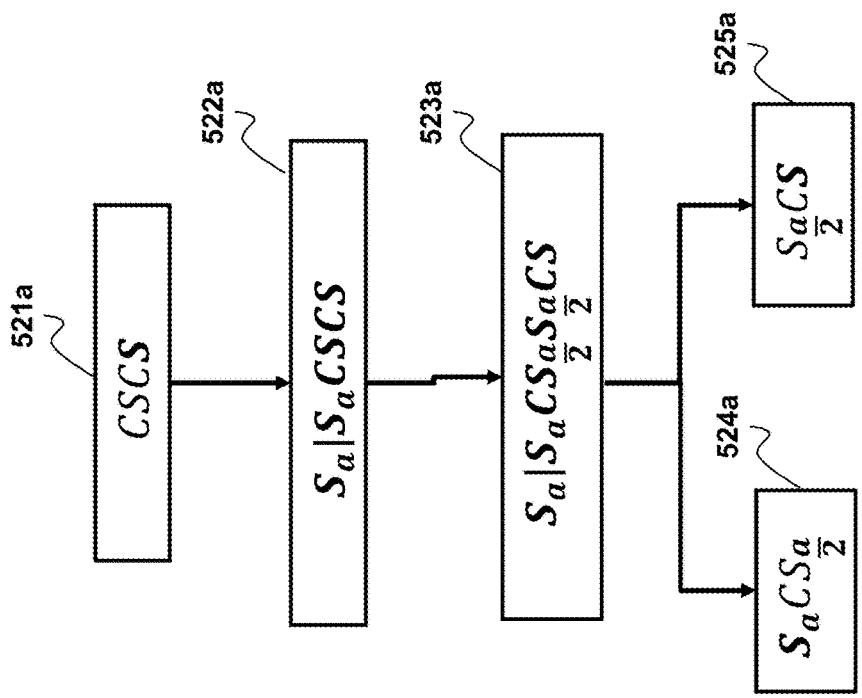
FIG. 5A3

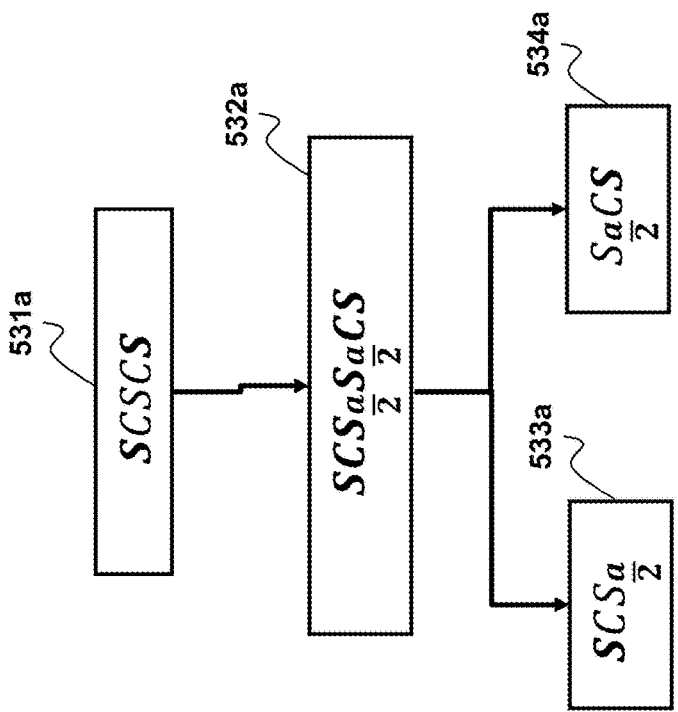
FIG. 5A4

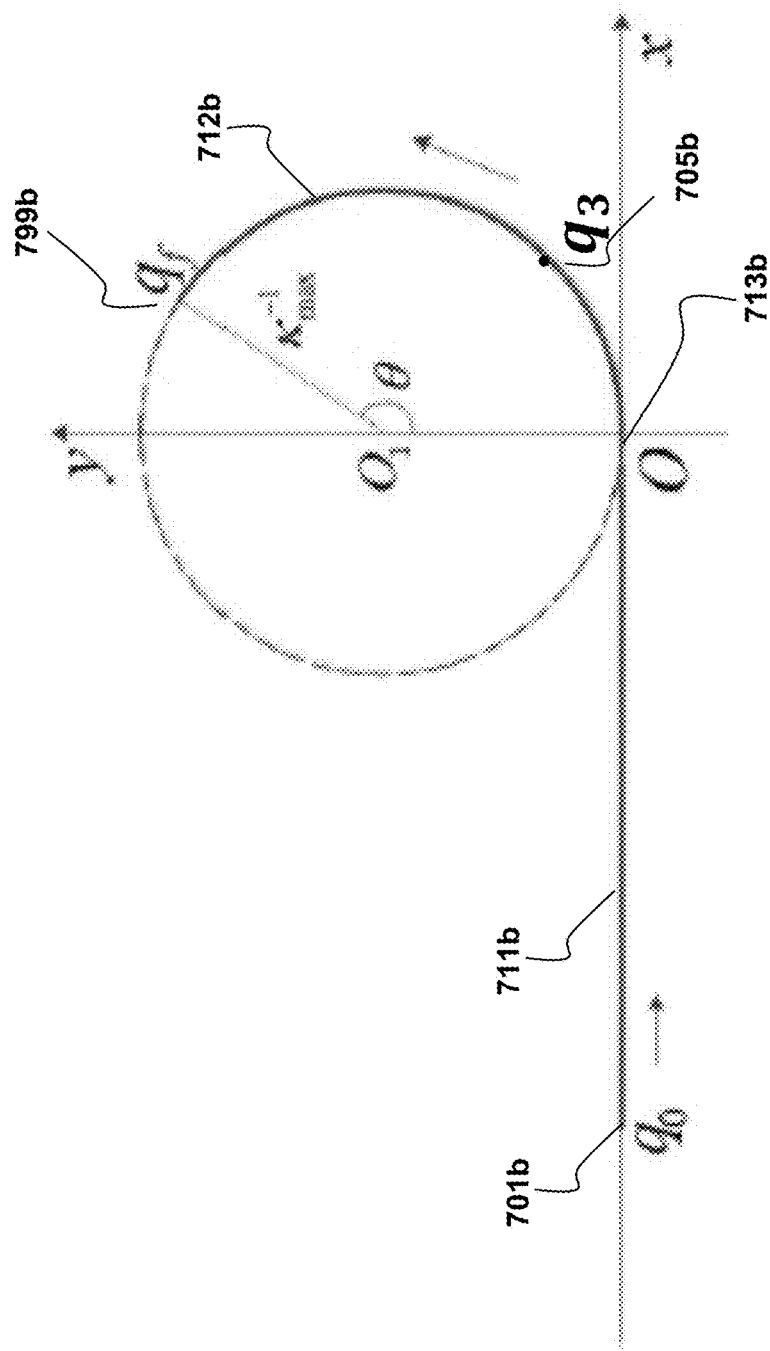
FIG. 7B1

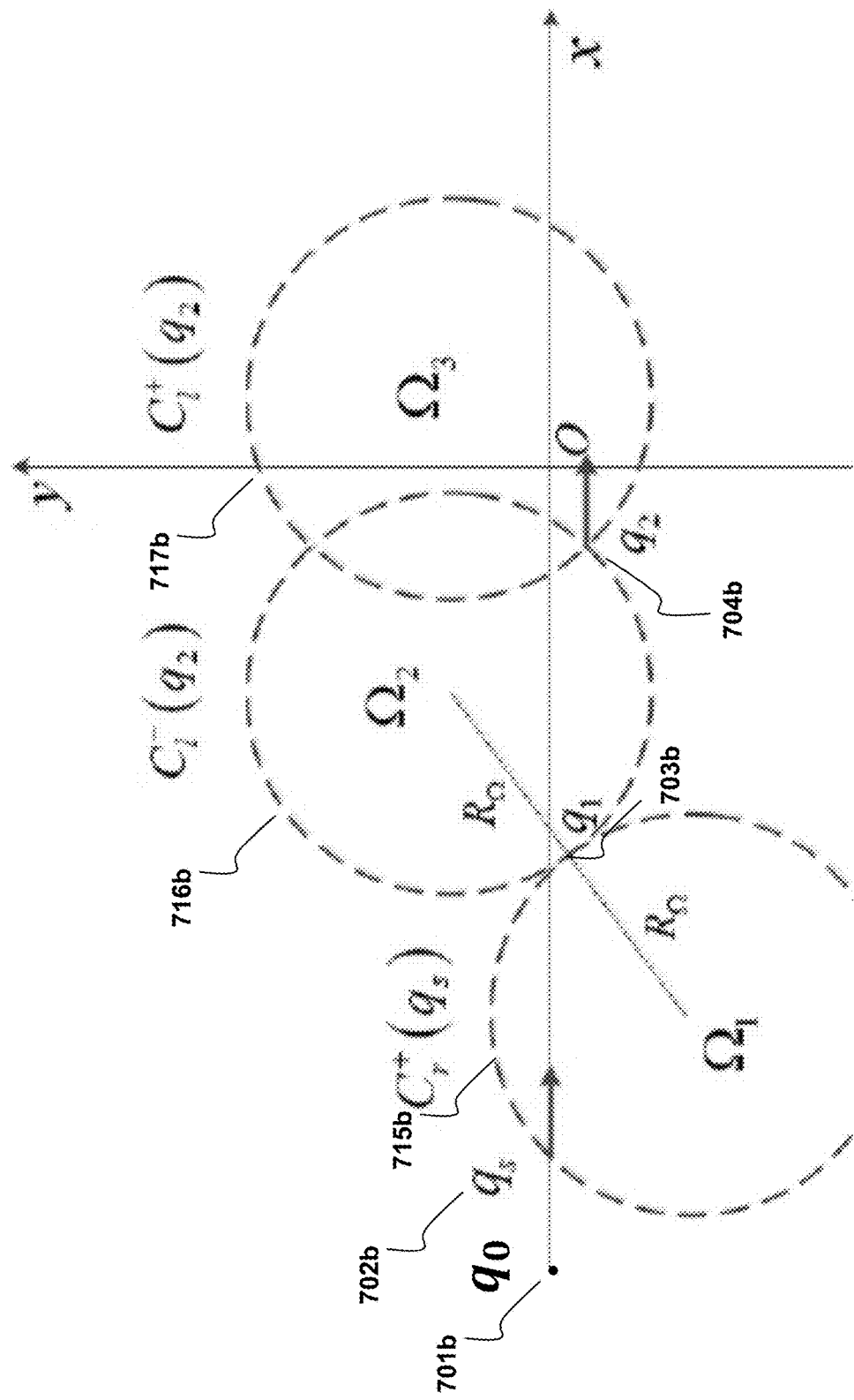
FIG. 7B2

Algorithm 1: $CCP-SC$ Algorithm

Input: Error bound $\epsilon$, initial steering rate $\sigma_{max}^0$, steering rate increment $\Delta\sigma$, iteration step $N$, initial configuration $q_0 = (x_0, 0, 0, 0)$ with $x_0 < 0$, and final configuration $q_f = (x_f, y_f, \theta_f, \kappa_{max})$.

Output: A continuous curvature path $\mathcal{P}_{CC}$ connecting $q_0$ and $q_f$ with desired steering rate $\sigma_{max}$ 1: Initialization $k = 0$
2: repeat
3:    $\sigma_{max}^k = \sigma_{max}^0 + k\Delta\sigma$
4:    Compute $R_\Omega^k$ and $\mu^k$ with respect to $\sigma_{max}^k$ according to (6)
5:    Compute $q_\Omega = (x_\Omega, y_\Omega, 0, 0)$ according to (6)
6:    if $|y_\Omega| > \epsilon$ then
7:      $k = k + 1$
8:    end if
9: until $|y_\Omega| \leq \epsilon$
10: repeat
11:    $\sigma_{max}^k = \sigma_{max}^0 + k\Delta\sigma$
12:    Compute the center $\Omega_2 = (x_{\Omega_2}, y_{\Omega_2})$ of $C_f^-(q_2)$
13:    Solve the equation $$\left(\frac{y_2 + x^*}{2} - x_{\Omega_1}\right)^2 + \left(\frac{y_2}{2} - y_{\Omega_1}\right)^2 = (R_\Omega^k)^2$$

14: until $x_0 < x^* < 0$ and $k \leq N$
15: Compute $\mathcal{P}_{CC}$
16: return $\mathcal{P}_{CC}$ and $\sigma_{max} = \sigma_{max}^k$

FIG. 7B3

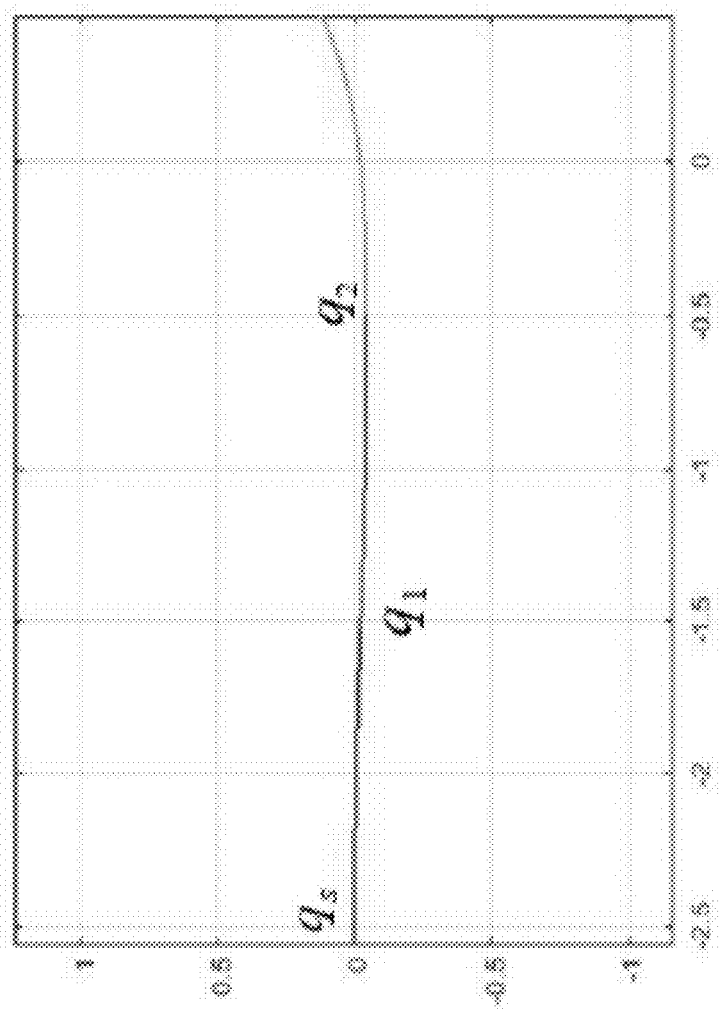
703a
FIG. 7B4

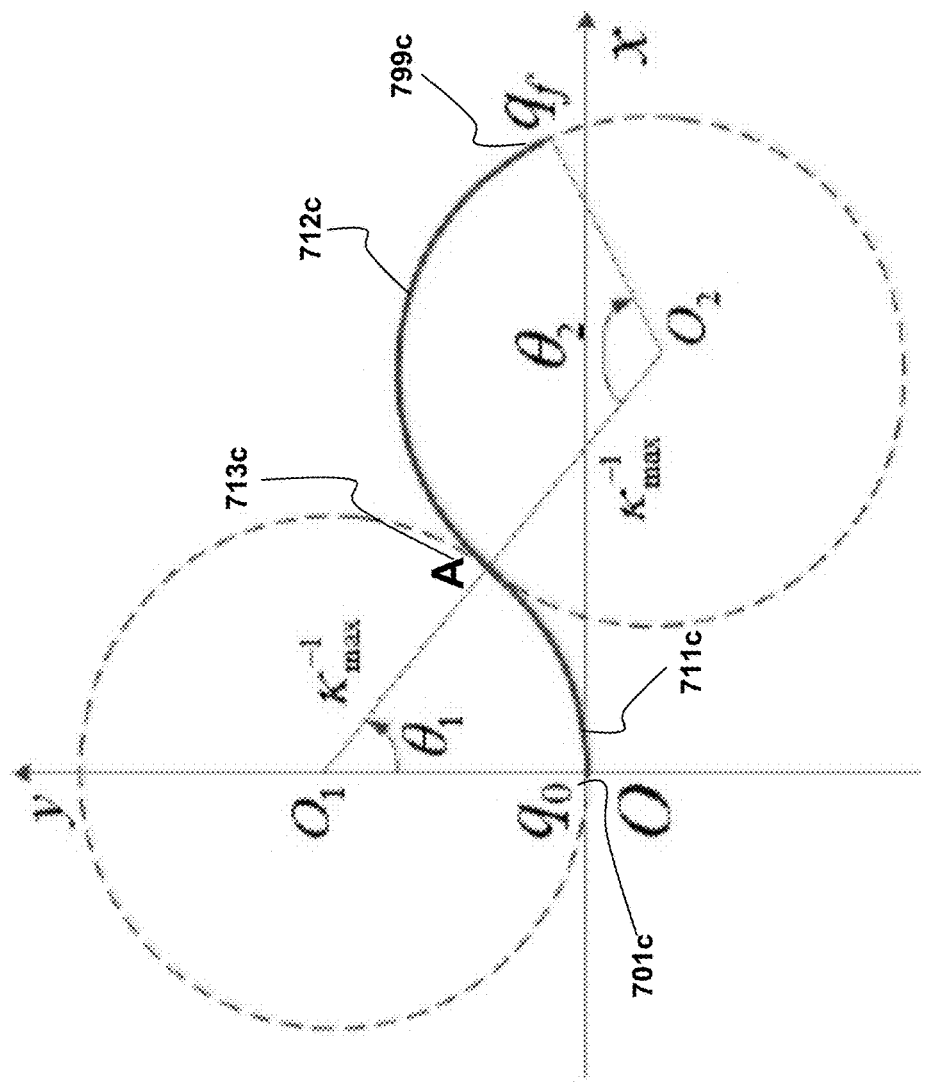
FIG. 7C1

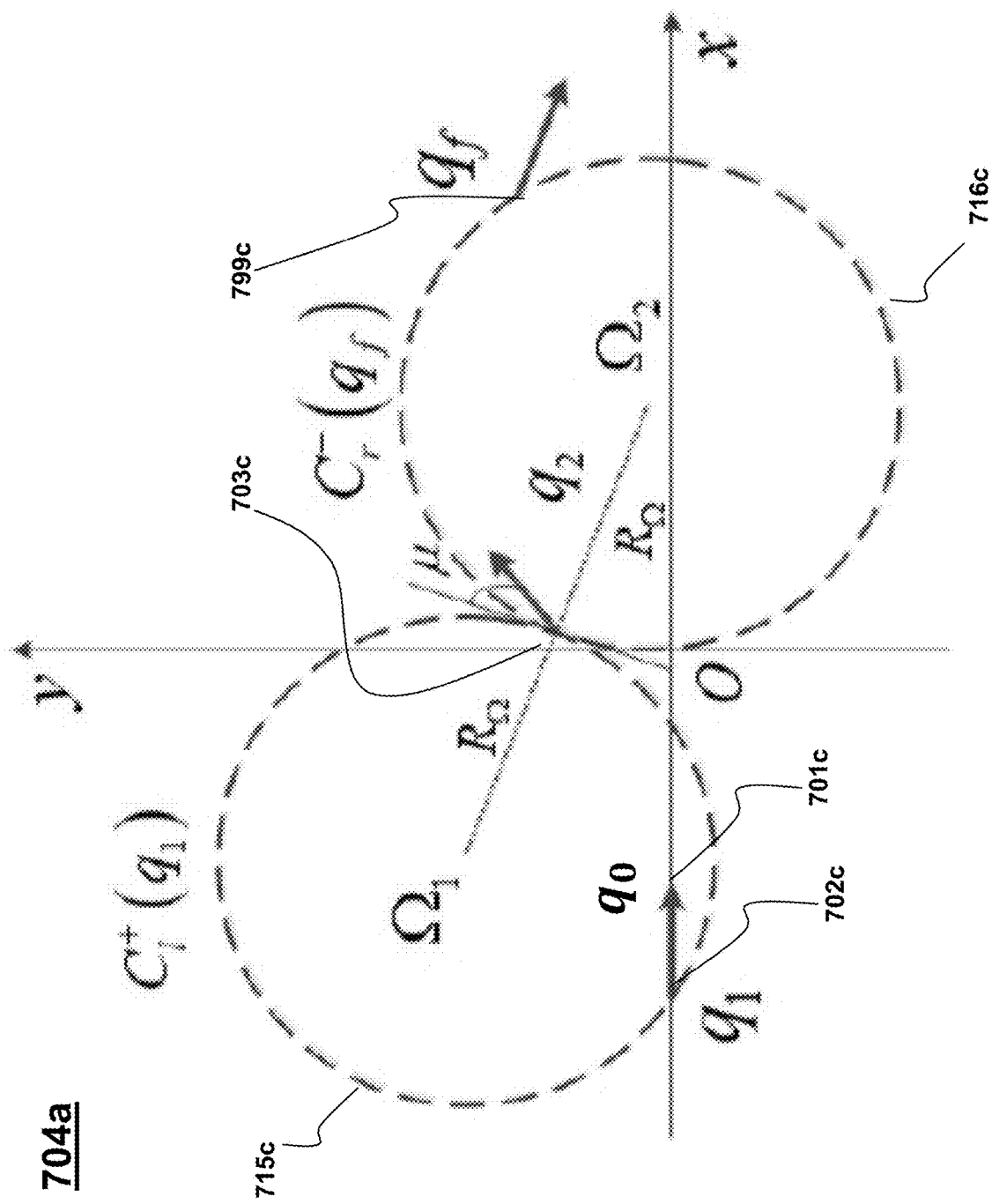
FIG. 7C2

Algorithm 2: $CCP - CC$ Algorithm

Input: Error bound $\epsilon$, initial steering rate $\sigma_{max}^0$, steering rate increment $\Delta\sigma$, iteration step $N$, initial configuration $q_0 = (0, 0, 0, 0)$, final configuration $q_f = (x_f, y_f, \theta_f, 0)$.

Output: A continuous curvature $S|CC$ path $\mathcal{P}_{CC}$ connecting $q_0$ and $q_f$ with desired steering rate $\sigma_{max}$ 1: Initialization: $k = 0$
2: repeat
3:    $\sigma_{max}^k = \sigma_{max}^0 + k\Delta\sigma$
4:    Compute $R_\Omega^k$ and $\mu^k$ according to (6) using $\sigma_{max}^k$
5:    Compute the center $\Omega_2^k = (x_{\Omega_2}^k, y_{\Omega_2}^k)$ of $C_f^-(q_f)$ with $R_\Omega^k$ and $\mu^k$
6:    Compute the center $\Omega_0^k = (x_{\Omega_0}^k, y_{\Omega_0}^k)$ of $C_l^+(q_0)$ with $R_\Omega^k$ and $\mu^k$
7:    Let $\Omega_1^k = (x_{\Omega_1}^k + x^*, y_{\Omega_1}^k)$ be the center of $C_l^+(q_1)$
8:    Solve the equation
$$(x_{\Omega_0}^k + x^* - x_{\Omega_2}^k)^2 + (y_{\Omega_0}^k - y_{\Omega_2}^k)^2 = (2R_\Omega^k)^2$$
   for $x^*$
9:    if $||x^*| > \epsilon$ or $x^* > 0$ then
10:      $k = k + 1$
11:    end if
12: until $|x^*| \leq \epsilon$ and $k \leq N$
13: Compute $\mathcal{P}_{CC}$
14: return $\mathcal{P}_{CC}$ and $\sigma_{max} = \sigma_{max}^k$

FIG. 7C3

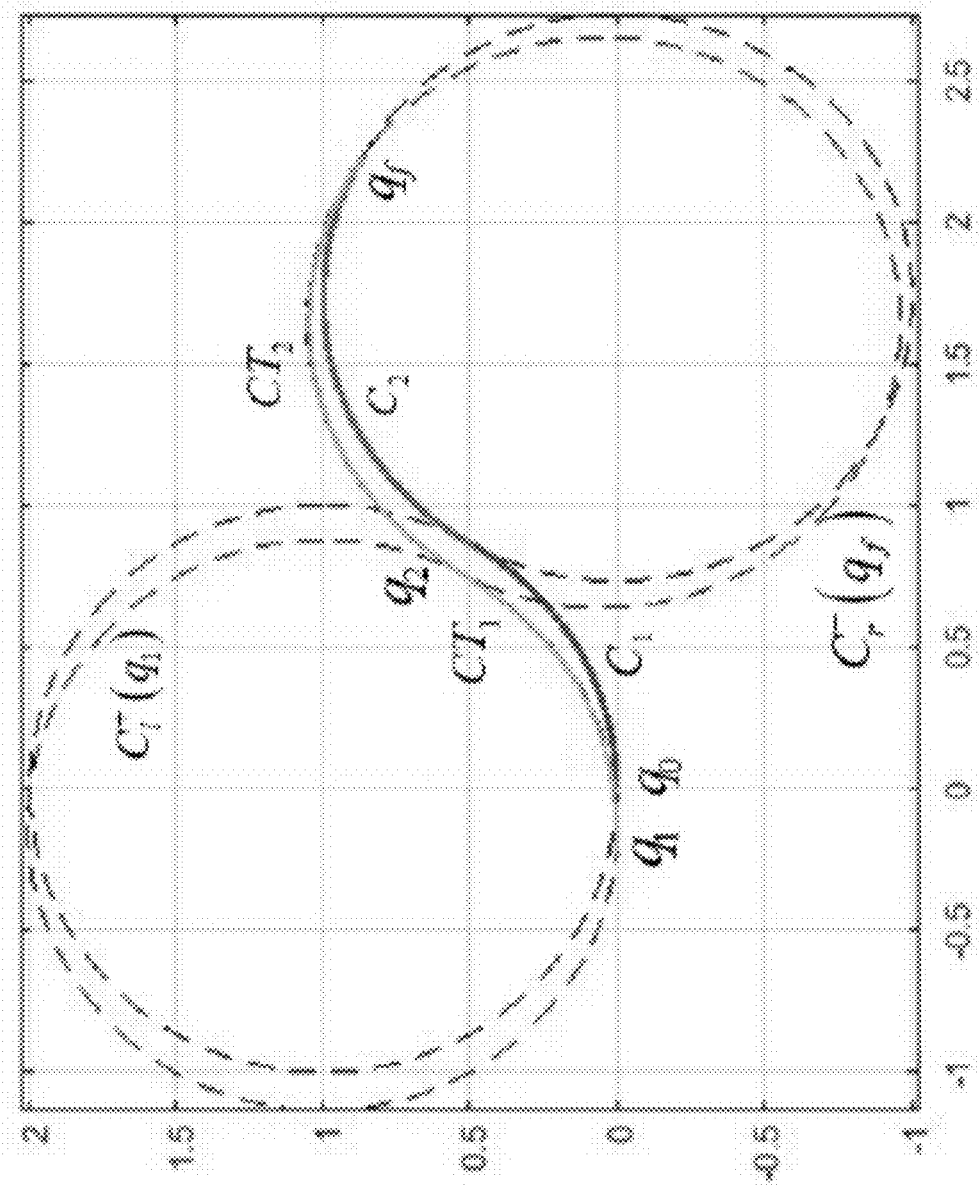
FIG. 7C4

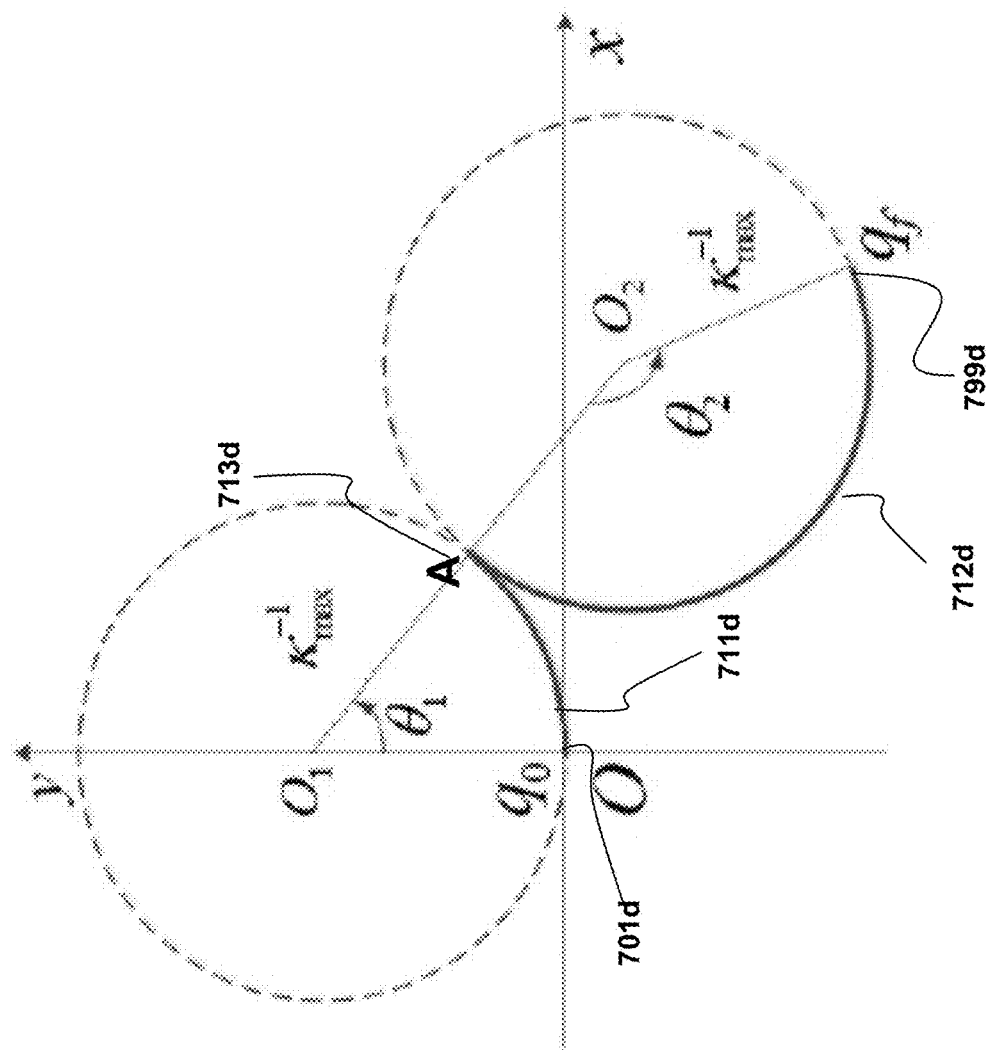
FIG. 7D1

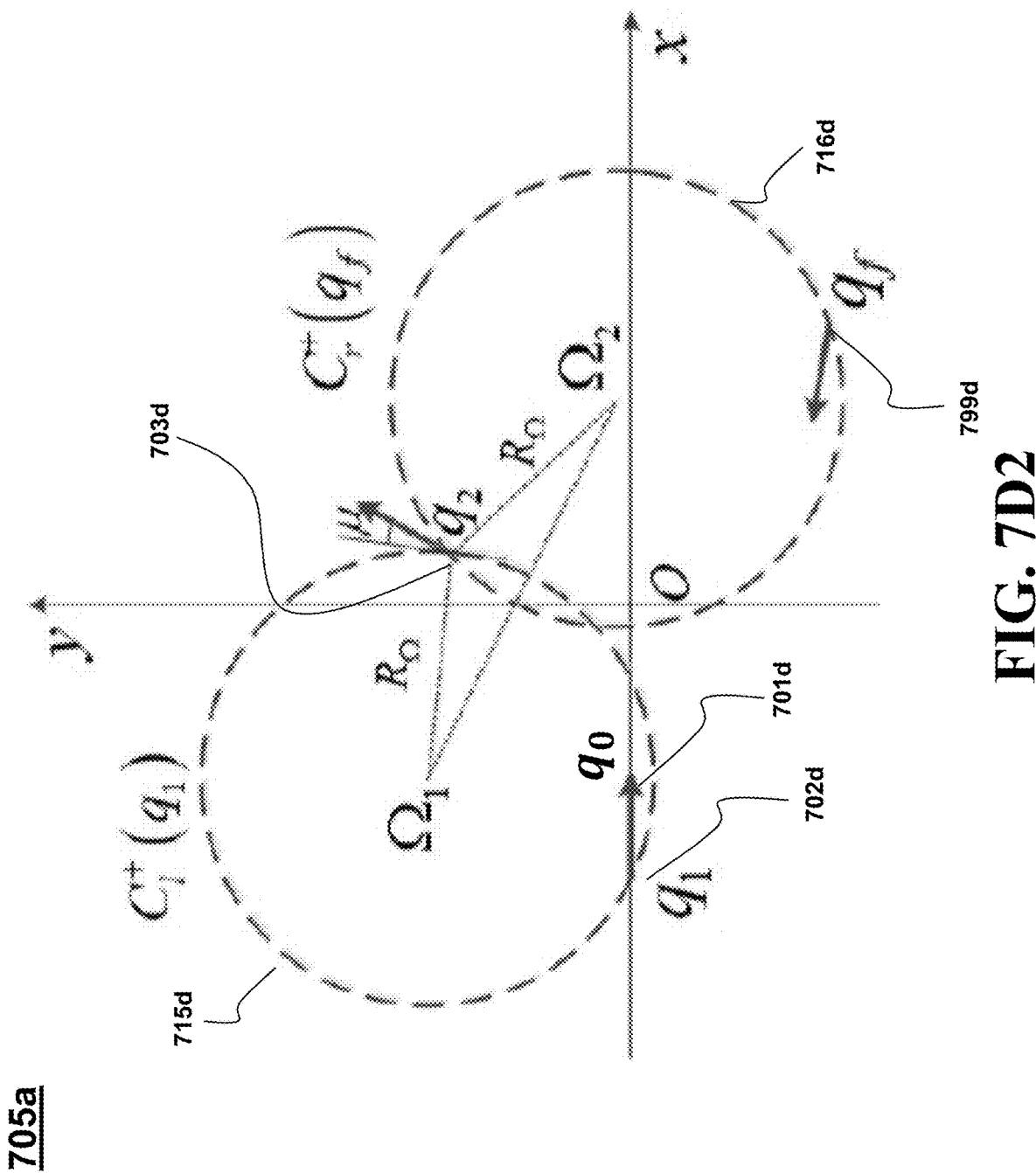
FIG. 7D2

Algorithm 3: $CCP - C|C$ Algorithm

Input: Error bound $\epsilon$, initial steering rate $\sigma_{max}^0$, steering rate increment $\Delta\sigma$, iteration step $N$, initial configuration $q_0^j = (0,0,0,0)$, final configuration $q_f = (x_f, y_f, \theta_f, 0)$.

Output: A continuous curvature $S|C|C$ path $\mathcal{P}_{CC}$ connecting $q_0$ and $q_f$ with desired steering rate $\sigma_{max}$ 1: Initialization: $k = 0$
2: repeat
3:    $\sigma_{max}^k = \sigma_{max}^0 + k\Delta\sigma$
4:    Compute $R_\Omega^k$ and $\mu^k$ with $\sigma_{max}^k$ according to (6)
5:    Compute the center $\Omega_2^k = (x_{\Omega_2}^k, y_{\Omega_2}^k)$ of $C_f^+(q_f)$ with $R_\Omega^k$ and $\mu^k$
6:    Compute the center $\Omega_0^k = (x_{\Omega_0}^k, y_{\Omega_0}^k)$ of $C_f^+(q_0)$ with $R_\Omega^k$ and $\mu^k$
7:    Let $\Omega_1^k = (x_{\Omega_0}^k + x^*, y_{\Omega_0}^k)$ be the center of $C_f^+(q_1)$
8:    Solve the equation $$(x_{\Omega_0}^k + x^* - x_{\Omega_2}^k)^2 + (y_{\Omega_0}^k - y_{\Omega_2}^k)^2 = (2R_{\Omega}^k \cos\mu^k)^2$$

for $x^*$
9:    if $||x^*| \leq \epsilon$ or $x^* > 0$ then
10:     $k = k + 1$
11:    end if
12: until $|x^*| \leq \epsilon$ and $k \leq N$
13: Compute $\mathcal{P}_{CC}$
14: return $\mathcal{P}_{CC}$ and $\sigma_{max} = \sigma_{max}^k$

FIG. 7D3

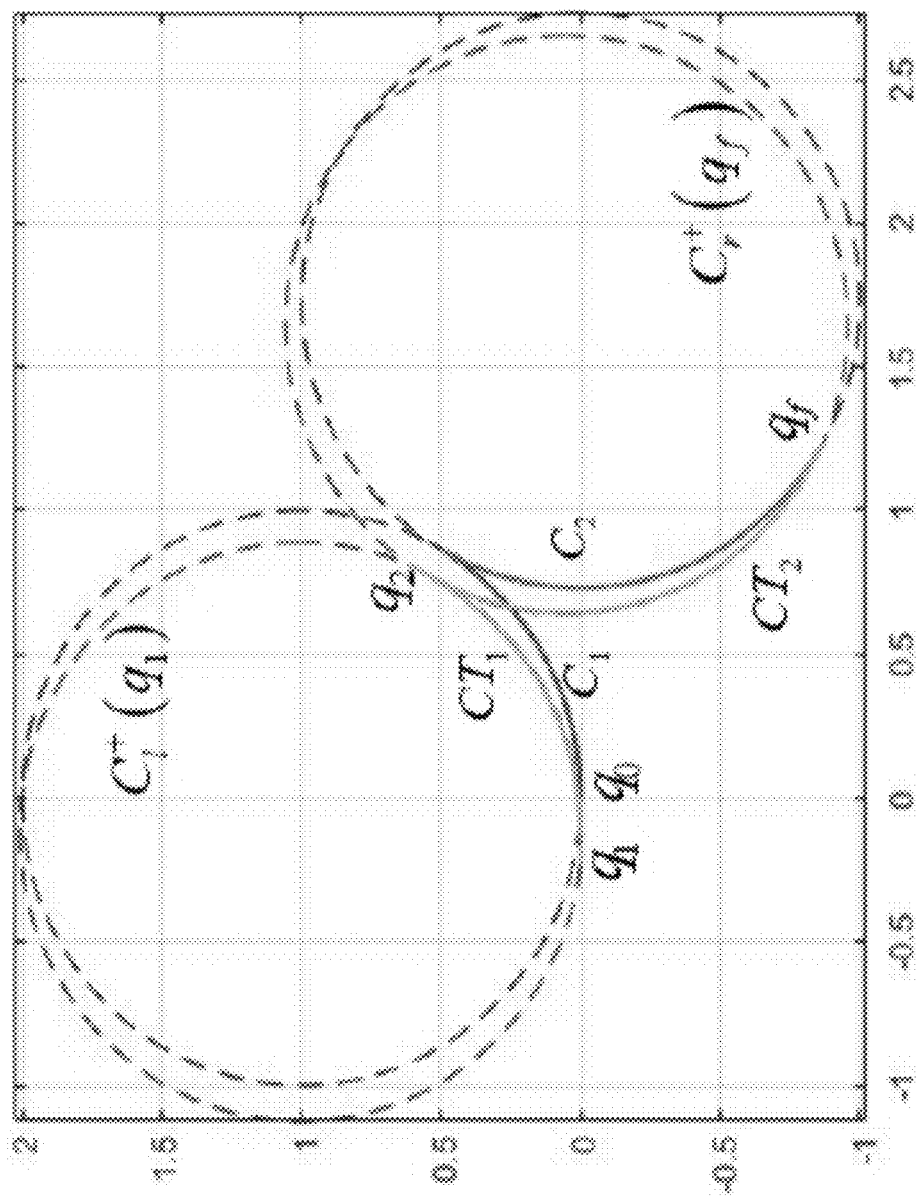
FIG. 7D4

MOTION CONTROLLER FOR REAL-TIME CONTINUOUS CURVATURE PATH PLANNING

TECHNICAL FIELD

This invention relates generally to path planning of motion of the vehicles, and more particularly to path planning systems and methods for automatically controlling a motion of a vehicle between different states.

BACKGROUND

Several control systems, employed by either autonomous vehicles or vehicles executing in autonomous-driving mode, predict future, safe motions, or paths, of the vehicle, both in order to avoid obstacles, such as other vehicles or pedestrians, but also to optimize some criteria associated to the operation of the vehicle. The vehicle is controlled along the path that is a part of the object trajectory or, more precisely, the projection of the trajectory onto the two-dimensional plane of movement. To say it more figuratively, the path is the line connecting all geometrical coordinates of the moving vehicle.

A fundamental objective of path planning is to construct a trajectory connecting two states, e.g., an initial state and a target state, of a moving object, such as autonomous or semi-autonomous vehicles executing in autonomous-driving mode, and to control the motion of the vehicles along the trajectory. A "state" as used herein is meant to be a vector including the geometrical coordinates of the vehicle in the plane and an orientation of the vehicle at these geometrical coordinates. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information.

A path connecting an initial state and a target state is normally made up of several elementary paths (or EPT for short). In some situations, the path planning solely works with elementary paths of the same or different kinds. To that end, the path of a moving body is normally made up of a plurality of elementary paths that share the same junction points (abbreviated as JP). Thus, the junction points are special points of the path because each of them belongs to two adjoining EPTs.

One special characteristic demanded of the paths is that states do not change erratically along the entire course or at the junction points. This is to say that the transition from one elementary path to an adjacent elementary path must be ensured to be continuous at the junction points of the elementary paths as well as both its first derivative (tangent) and its second derivative (curvature). The path is continuous at junction points when the transition from one elementary path to the adjacent elementary path can be performed by changing a steering and velocity of the vehicle in a linear or continuous manner.

For example, pioneering work by Dubins and Reeds and Shepp investigated patterns of a shortest path between two states of the vehicle. The shortest path, termed as Reeds-Shepp's (RS) path, is a sequential composition of line segments and/or tangential circular arcs of a minimum/fixed turning radius. The RS path can be computed in a very efficient way, but the curvature along the RS path involving multiple segments is discontinuous. Such discontinuity of the curvature is undesirable in practice, since a vehicle has to stop and perform stationary steering, leading to unnecessary time delay and extra wearing of tires.

Some conventional methods prefer to base its path planning on clothoids because they are closely related to the rules of movement of steered motor vehicles. A clothoid is a special type of plane curves, which has its curvature, denoted by c, changing in a linear manner along the path. Clothoids have the added benefit of the length of the path being minimized when an initial state is connected with a terminal state.

For example, the teaching of T. Fraichard and A. Scheuer, "From Reeds and Shepp's to continuous curvature paths," introduces a concept of a clothoid turn (abbreviated as CC turn) formed by two clothoids connected by a circular arc, and teaches μ-tangency conditions to ensure continuous curvature transitions among CC turns and straight lines. However, a continuous curvature path typically includes a sequence of multiple CC turns and lines, and it can be time consuming to find the parameters of the optimal sequence forming the continuous curvature path.

Instead of computing continuous curvature paths directly, another category of methods construct a continuous curvature path by first computing an RS path. For example, method described in U.S. 2016/03133735 first determines an RS path and tries to find a continuous curvature path which stays as close as possible to the RS path. This method computes the continuous curvature path by solving optimization problems with nonlinear constraints. However, the solution to this method requires iterative process, which can be computationally prohibitive for a number of practical applications. Also, the resultant optimization problem of that method is non-convex. A feasible solution to the non-convex problem is not guaranteed solved by the iterative process, and thus the construction of the continuous curvature path may fail. Hence, this method may not be suitable for a real-time control of the vehicles. Similarly, the method described in U.S. Pat. No. 8,428,820 improves the computation efficiency, but still entails computationally expensive iterative process to construct the continuous curvature path. Hence, this method also may not be suitable for a real time control of the vehicles.

Accordingly, there is a need to construct a continuous curvature path for controlling a motion of a vehicle from an initial to a target state in a manner suitable for real-time control of the vehicles. This work performs continuous curvature path planning, with the hope to achieve similar computational efficiency and reliability as the RS path planning.

SUMMARY

It is an object of some embodiments to provide a path planning system and method to construct a continuous curvature path connecting an initial state to a target state of a vehicle. It is another object of some embodiments to provide such a system and a method that are suitable for real-time control of the vehicles. As used herein, the continuous curvature path is as a sequential composition of multiple elementary paths connected such that the transition from one elementary path to an adjacent elementary path is continuous at the junction points of the elementary paths as well as both its first derivative and second derivatives. Examples of an elementary path include straight line, circular arc, splines, polynomials, trigonometric functions, clothoids, and clothoid turns. In contrast, a discontinuous curvature path is a path tin with at least two elementary paths are connected at discontinuous curvature junction.

Some embodiments perform real-time continuous curvature (CC) path planning for vehicles and other robots considering obstacle avoidance. Some embodiments are motivated by the fact that Reeds-Shepp's (RS) based path planning remains unmatched in terms of computation efficiency and reliability when compared with various CC path planning results that consider obstacle avoidance. However, the RS path is discontinuous in its curvature. To that end, some embodiments disclose methods to achieve almost equivalent computational efficiency and reliability as RS path planning by post-processing RS paths. In some implementations, the post-processing resorts to geometric interpretation of $\mu$-tangency conditions, and thus not only allows a majority of planning work done offline, but also enables development of convergence guaranteed algorithms.

Some embodiments post-processes discontinuous curvature paths to generate a CC path, which not only satisfies the CC property, but also stays inside a neighborhood of the discontinuous curvature path to maintain obstacle clearance so that collision detection for the CC path can be avoided. In order to ensure the CC property. Some embodiments exploit the geometric insights casted by $\mu$-tangency conditions to process discontinuous curvature paths.

Specifically, some embodiments are based on recognition that according to classes and patterns of RS paths, the discontinuous curvature paths have up to four types of discontinuous curvature junctions (DCJs): SC,CS,CC,C|C, with S, C, and | representing straight line segments, circular arcs, and change of velocity direction, respectively. L and R specify left and right turns with + or − denoting forward or backward motion, respectively. Therefore, four distinctive schemes are devised offline for post-processing all four types of DCJs. As long as one can resolve these four DCJs, then the entire RS path between two configurations $q_s$ and $q_f$, including a combination of these DCJs, can be processed to produce a CC path between $q_s$ and $q_f$.

One embodiment further identifies and simplifies critical conditions to determine parameters of disclosed schemes. These critical conditions, derived on the basis of $\mu$-tangency conditions, take forms of nonlinear equations. For the SC type of DCJs, the resultant nonlinear equation can be simplified and solved analytically, and thus done offline. For the CC and C|C types, these critical equations are further simplified offline, based on geometry, into a set of simplified nonlinear equations, which can be shown the existence of solutions, and solved analytically. Thus the proposed schemes guarantee the success of treating RS paths. The simplified nonlinear equations need to be solved online, and this invention teaches algorithms that can solved them efficiently.

In one embodiment, the RS path planning should generate an RS path, between an initial configuration $q_0$ and a final configuration $q_f$, which has a $\epsilon$-clearance (at least $\epsilon$ far away from obstacles in all directions). In another embodiment, the RS path planning generates an RS path, between $\bar{q}_0 = q_0 - c$ and $q_f$, where c is an offset vector along the backward motion of the robot at $q_0$. As a result, the RS path between $q_0$ and $g_f$ starts with a forward straight line motion with a certain length, and thus the post-processing always deals with RS paths beginning with S segments. The schemes, to treat SC,CC,C|C DCJs, does not include backward motion, and the resultant CC path has simpler maneuvers.

Accordingly, one embodiment discloses a system for controlling a motion of a vehicle from an initial state to a target state. The system includes a path planner to determine a discontinuous curvature path connecting the initial state with the target state by a sequential composition of driving patterns, wherein the discontinuous curvature path is collision-free within a tolerance envelope centered on the discontinuous curvature path; a path transformer to locate and replace at least one treatable primitive in the discontinuous curvature path with a corresponding continuous curvature segment to form a modified path remaining within the tolerance envelope, wherein each treatable primitive is a predetermined pattern of elementary paths; and a controller to control the motion of the vehicle according to the modified path.

Another embodiment discloses a method for controlling a motion of a vehicle from an initial state to a target state, wherein the method uses a processor coupled with stored instructions implementing the method, wherein the instructions, when executed by the processor carry out at least some steps of the method. The method includes determining a discontinuous curvature path connecting the initial state with the target state by a sequential composition of driving patterns, wherein the discontinuous curvature path is collision-free within a tolerance envelope centered on the discontinuous curvature path; locating and replacing at least one treatable primitive in the discontinuous curvature path with a corresponding continuous curvature segment to form a modified path remaining within the tolerance envelope, wherein each treatable primitive is a predetermined pattern of elementary paths; and controlling the motion of the vehicle according to the modified path.

Another embodiment discloses a non-transitory computer readable storage medium embodied thereon a program executable by a processor for performing a method. The method includes determining a discontinuous curvature path connecting the initial state with the target state by a sequential composition of driving patterns, wherein the discontinuous curvature path is collision-free within a tolerance envelope centered on the discontinuous curvature path; locating and replacing at least one treatable primitive in the discontinuous curvature path with a corresponding continuous curvature segment to form a modified path remaining within the tolerance envelope, wherein each treatable primitive is a predetermined pattern of elementary paths; and controlling the motion of the vehicle according to the modified path.

BRIEF DESCRIPTION OF THE DRAWINGS

FIG. 1C summarizes classes and driving patterns of shortest length paths, which are also termed as Reed-Shepp (RS) paths.

FIG. 1GB illustrates $\mu$-tangency conditions between a left forward clothoid turn and a right backward clothoid turn.

FIG. 3B shows a table with examples of different RS driving patterns determined by different embodiments of an RS path planner.

FIGS. 5A1, 5A2, 5A3, 5A4, 5B, 5C, 5D, 5E, 5F and 5G show different examples of converting different RS patterns into a sequence of treatable primitives according to some embodiments.

FIGS. 7B1, 7B2, 7B3, and 7B4 show schematics of treating discontinuous curvature junction SC to form a continuous curvature junction according to one embodiment.

FIGS. 7C1, 7C2, 7C3, and 7C4 show schematics of treating discontinuous curvature junction CC to form a continuous curvature junction according to one embodiment.

FIGS. 7D1, 7D2, 7D3, and 7D4 show schematics of treating discontinuous curvature junction QC to form a continuous curvature junction according to one embodiment

DETAILED DESCRIPTION

Figure 1A:
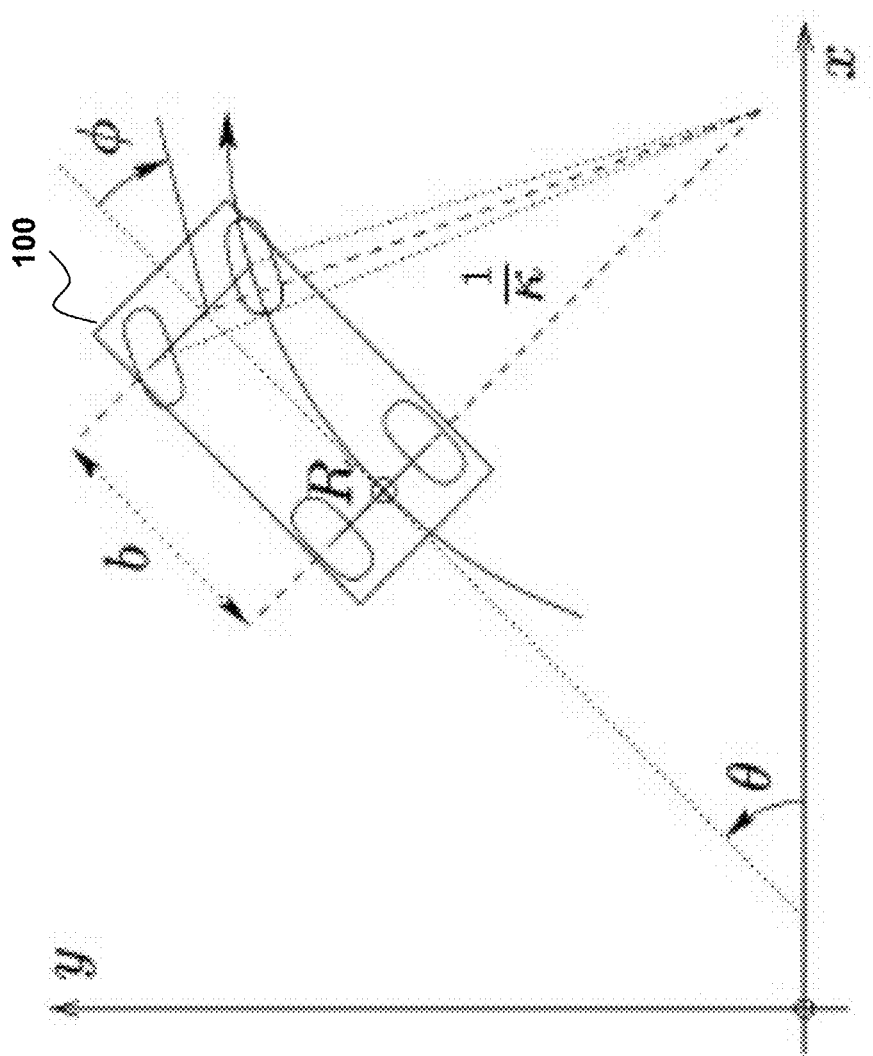
FIG. 1A shows a schematic of a vehicle equipped with a front-fixed steering wheel and fixed parallel rear wheels control by some embodiments.

FIG. 1A shows a schematic of a vehicle equipped with a front-fixed steering wheel and fixed parallel rear wheels control by some embodiments. A point R is located at the mid of rear wheels of the vehicle. A pose of the vehicle is uniquely described by a triple $(x, y, \theta)$ where $(x, y)$ represent the coordinates of R in an earth frame and $\theta$ is an orientation angle of the vehicle with respect to the positive x-axis of the earth frame. The vehicle has a wheelbase b, and a steering angle $\phi$.

A kinematic model of the vehicle is given by $$\begin{pmatrix} \dot{x} \\ \dot{y} \\ \dot{\theta} \\ \dot{\kappa} \end{pmatrix} = \begin{pmatrix} \cos\theta \\ \sin\theta \\ \kappa \\ 0 \end{pmatrix} v + \begin{pmatrix} 0 \\ 0 \\ 0 \\ 1 \end{pmatrix} \sigma, \quad (1)$$

where a curvature $\kappa$ is an extra configuration parameter in addition to $(x, y, \theta)$.

Control inputs in the vehicle model (1) are $u=(v,\sigma)$, where v is a driving velocity of the rear wheels and $\sigma$ a steering rate. The relationship between $\phi$, $\kappa$ and $\sigma$ is established as follows:

$$\kappa = \frac{\tan\phi}{b}, \sigma = \dot{\kappa} = \frac{\dot{\phi}}{b\cos^2\phi}.$$

Assume that both forward and backward motions are allowed for the vehicle and the driving velocity is bounded, whereas the angle of the steering wheel is subject to mechanical constraints, i.e., $$|v| \le v_{max}, |\phi| \le \phi_{max}, |\kappa| \le \kappa_{max} = \frac{\tan\phi_{max}}{b}. \quad (2)$$

The steering rate $\sigma$ is also assumed to be bounded, i.e., $$|\sigma| \le \sigma_{max}. \quad (3)$$

Any path satisfies the vehicle model (1) has continuous curvature $\kappa$ along the path, and thus is a continuous curvature (CC) path. According to some embodiments, a configuration or state of the vehicle is defined by $q=(x, y, \theta, \kappa)$.

Figure 1B:
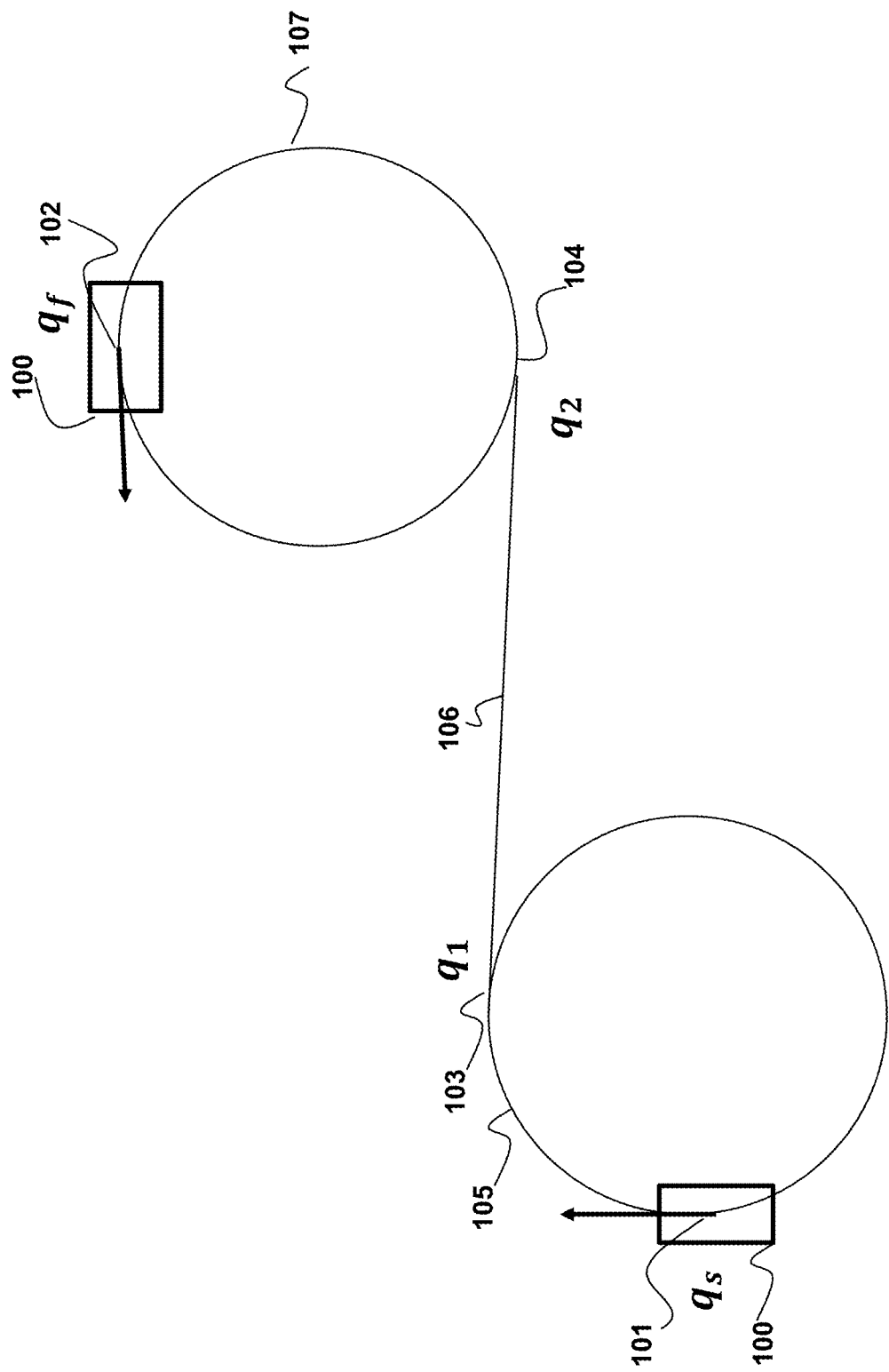
FIG. 1B shows an example of a continuous curvature path planning (CCPP) problem considered some embodiments.

FIG. 1B shows an example defining a continuous curvature path planning (CCPP) problem considered some embodiments. Given an initial state 101 $q_s=(x_s, y_s, \theta_s, \kappa_s)$, a final state 102 $q_f=(x_f, y_f, \theta_f, \kappa_f)$ and the vehicle model (1) with constraints (2) (3), find a feasible path $P_{cc}$ between $q_s$ and $q_f$ such that for a finite time $T_f$,
1. Boundary conditions $P_{cc}(0)=q_s$ and $P_{cc}(T_f)=q_f$;
2. Feasibility $\forall t \in [0, T_f], P_{cc}(t) \in R^2 \times S^1 \times [-\kappa_{max}, \kappa_{max}]$.

FIG. 1C summarizes classes and driving patterns of shortest length paths, which are also termed as Reed-Shepp (RS) paths. In the context of RS paths, C in FIG. 1C stands for a circular arc and S stands for a straight line segment; while L and R specify left and right turns with + or − denoting forward or backward motion, respectively. Subscripts denote (absolute) angular values of certain circular arc and | represents a change of moving direction.

FIG. 1B also includes one example RS path in a driving pattern R+S+R+ of class CSC-1 connecting 101 and 102. The example RS path consists of three segments: a circular arc 105, a line 106 and a circular arc 107. The RS path is undesirable according to certain criteria because its curvature is discontinuous at points 101, 103, 104, and 102, which incur stationary steering, time delay, and extra tire wearing.

Solving the exact CCPP is time-consuming. Instead, some embodiments perform the CCPP by seeking for sub-optimal CC paths on the basis of RS path patterns. Furthermore, some embodiments obtain CC paths that "mimic" the corresponding RS path patterns within a bounded error refereed herein as a tolerance envelope centered on the discontinuous curvature path. Towards this end, some embodiments define a $\varepsilon$ neighbor of a given path P as follows $$B(P, \varepsilon) = \bigcup_{(x,y) \in P} \{(x', y') \in R^2 : |(x', y') - (x, y)| < \varepsilon\}$$

where $\varepsilon>0$ is the error bound and $|X|$ denotes the standard 2-norm of vectors X.

Accordingly, the sub-optimal CCPP can be viewed as the following "continuous curvature conversion" problem.

Problem 1 Given an RS path $P_{RS}$ connecting an initial configuration $q_0$ and a final configuration $q_f$ in C', find a continuous curvature path $P_{CC}$ such that (i). $P_{cc}(0)=q'_0$, $P_{CC}(1)=q'_f$ where $q'_0$ (resp., $q'_f$) is the initial (resp., final) configuration in the augmented configuration space C' with null curvature $\kappa_0=0$ (resp., $\kappa_f=0$);
(ii). $P_{CC}$ satisfies the model (1)-(3) for certain $[v,\bar{\sigma}]\in U$;
(iii). $P_{CC}$ remains in the $\varepsilon$-neighborhood $B(P_{RS}, \varepsilon)$ for a given $\varepsilon>0$.

Some embodiments are based on realization that Problem 1 leverages the design freedom v to post-process RS paths into CC paths. The problem is well-posed, i.e., its solutions are guaranteed to exist, which can be loosely shown by the following argument. By treating the path length s as the independent variable, system (1) can be rewritten $dx/ds=\cos\theta, dy/dx=\sin\theta, d\theta/ds=\kappa, d\kappa/ds=\bar{\sigma}/v$. Let us define a velocity profile $v_{CC}$ along $P_{RS}$, where $v_{CC}$ takes a small value $\bar{v}$ around discontinuous curvature junctions (DCJs). This means that around the DCJs, (beds is fairly large, and thus instantaneous curvature changes of $P_{rs}$ can be approximated well. Each $v_{CC}$ gives rise to a CC path $P_{CC}$, which can be obtained by integrating system (1). By choosing different $\bar{v}$, one can obtain a family of CC paths $P_{CC}(\bar{v})$, which are parameterized by $\bar{v}$ and has continuous dependence on it. As $\bar{v}\to 0$, $P_{CC}(\bar{v})\to P_{RS}$. Hence, given a neighborhood $B(P_{RS},\varepsilon)$, one can always find $\hat{v}>0$ such that as long as $0<\bar{v}<\hat{v}$ around DCJs, the CC path $P_{CC}(\bar{v})$ satisfies conditions in Problem 1.

Some embodiments are based on realization that disjunctions can be resolved using clothoid and/or clothoid turns. A clothoid can be a curve satisfying (1), and its curvature $\kappa$ varies linearly with respect to its arc length s, i.e., $\kappa(s)=\sigma_{max}s$, where $\sigma_{max}$ is a sharpness of the clothoid. In one embodiment, configurations of a clothoid, defined over $0\leq s\leq \kappa_{max}/\sigma_{max}$, can be determined by integrating system (1) along the clothoid arc $$q(s)=\begin{pmatrix}x(s)\\y(s)\\\theta(s)\\\kappa(s)\end{pmatrix}=\begin{pmatrix}\sqrt{\pi/\sigma_{max}}C_f\left(\frac{s}{\sqrt{\pi/\sigma_{max}}}\right)\\\sqrt{\pi/\sigma_{max}}S_f\left(\frac{s}{\sqrt{\pi/\sigma_{max}}}\right)\\\frac{1}{2}\sigma_{max}s^2\\\sigma_{max}s\end{pmatrix}, \quad (4)$$

where $$C_f(s)=\int_0^s \cos\frac{\pi}{2}\tau^2 d\tau \text{ and } S_f(s)=\int_0^s \sin\frac{\pi}{2}\tau^2 d\tau$$

are the Fresnel cosine and sine integrals, respectively. The clothoid for a given $\sigma_{max}$ can be pre-computed and is plotted in FIG. 1D as an arc connecting $q_s$ and $q_1$.

A deflection of the clothoid represents a difference in orientations of $q_s$ and $q_1$. For fixed $\kappa_{max}$ and $\sigma_{max}$, the clothoid has important properties
1. a constant deflection $\delta_c=\kappa_{max}^2/(2\sigma_{max})$
2. a constant arc length $s=\kappa_{max}/\sigma_{max}$.
3. a uniquely determined solution q(s).

These properties can be pre-computed and stored in memory for computational efficiency.

Figure 1D:
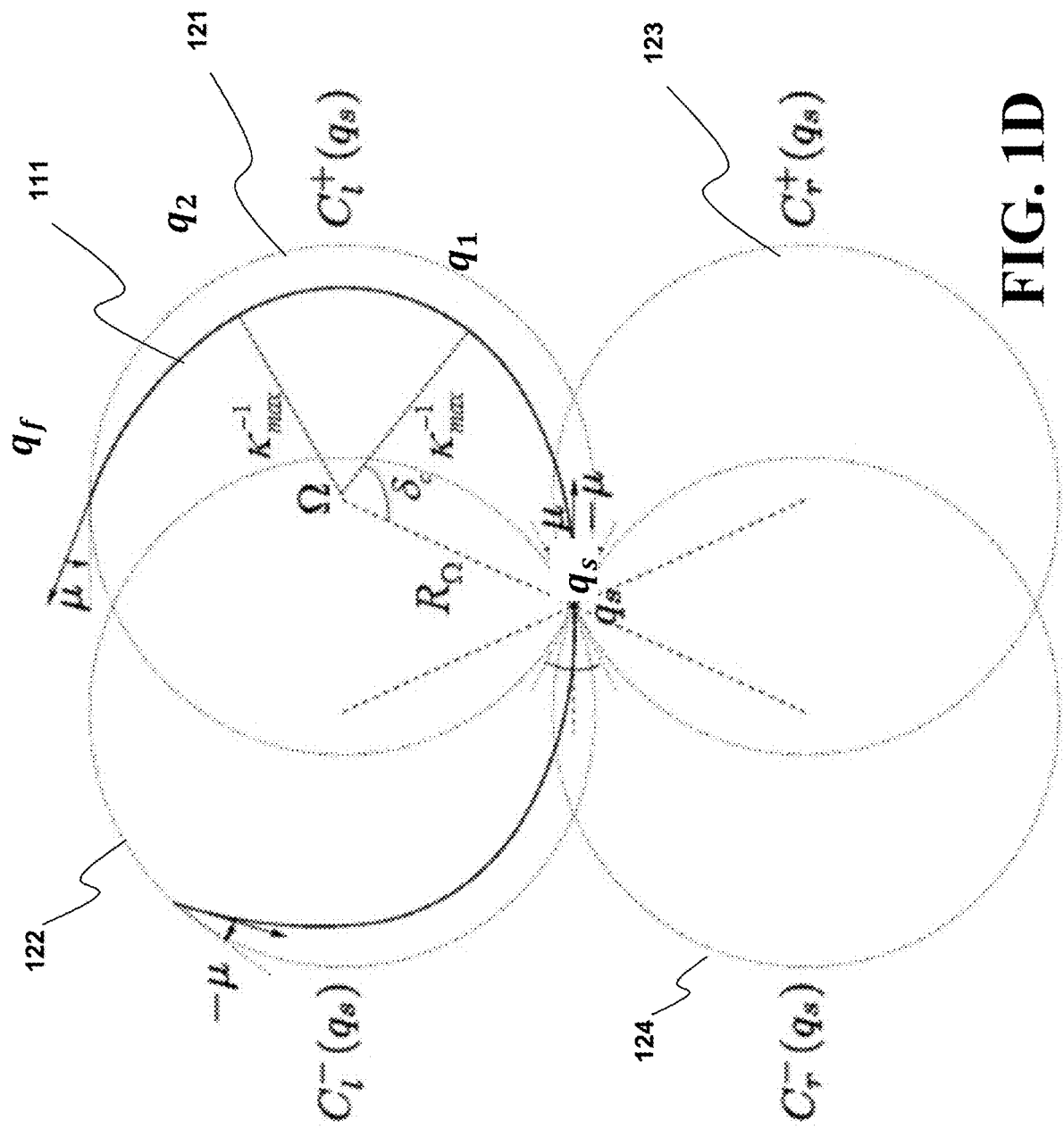
FIG. 1D shows an example of a clothoid turn used by some embodiments.

FIG. 1D shows an example of a clothoid turn used by some embodiments. Specifically, FIG. 1D plots the left forward clothoid turn 111, exemplifying a case $2\delta_c\leq\delta<2\delta_c+\pi$, consists of
1. a clothoid from $q_s$ to $q_1$ with a sharpness $\sigma_{max}$;
2. a circular arc of radius $\kappa_{max}^{-1}$ and of angle $\delta_f-2\delta_c$, starting from $q_1$ and ending at $q_2$;
3. a second clothoid starting from $q_2$ with sharpness $-\sigma_{max}$ and ending at $q_f$.

When $\delta=0$, a clothoid turn reduces to a line segment of length $2R_\Omega \sin\mu$, where $R_\Omega$ and $\mu$ are defined later. For $0\leq\delta<2\delta_c$, a clothoid turn contains a clothoid of a sharpness $\sigma\leq\sigma_{max}$ and a symmetric clothoid of a sharpness $-\sigma$, where the sharpness $\sigma$ is given by $$\sigma = \frac{\pi\left(\cos\frac{\delta}{2}C_f\left(\sqrt{\frac{\delta}{\pi}}\right)+\sin\frac{\delta}{2}S_f\left(\sqrt{\frac{\delta}{\pi}}\right)\right)^2}{R_\Omega^2 \sin^2\left(\frac{\delta}{2}+\mu\right)},$$

and the length of each clothoid is $\sqrt{\delta/\sigma}$. Clothoid turns with $2\delta_c+\pi\leq\delta<2\pi$ correspond to left backward motions, and can be treated similarly. It is clear that a clothoid turn can be parameterized by its deflection $\delta$, and a line segment can be parameterized by its length l.

Figure 1E:
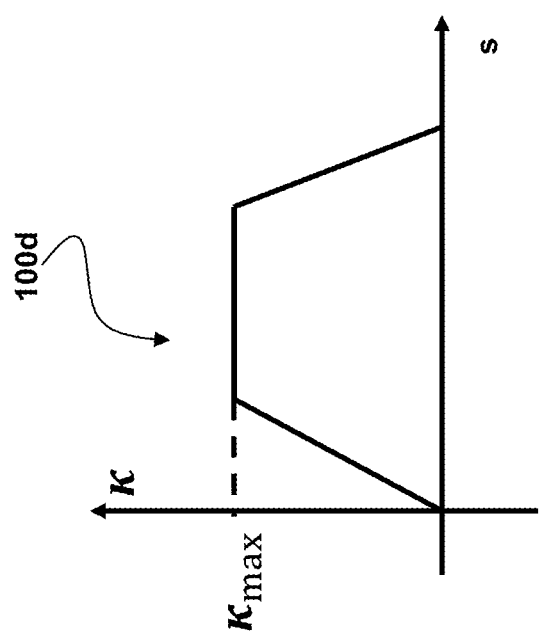
FIG. 1E shows a graph illustrating how curvature changes along a clothoid turn.

FIG. 1E shows a graph illustrating how curvature changes along a clothoid turn such as the clothoid turn is given by an arc 111 from $q_s$ to $q_f$ in FIG. 1D, where the arc represents a left forward clothoid turn, equivalently a left turn and forward movement. Depending on its deflection $\delta=\theta_s-\theta_f$, a clothoid turn can include up to two clothoids and one circular arc.

One concept in simplifying the sub-optimal CCPP from geometric perspectives is CC Circle. FIG. 1D shows four CC circles associated with a configuration $q_s$. Particularly, 121 $C_l^+(q_s)$, 122 $C_l^-(q_s)$, 123 $C_r^+(q_s)$, and 124 $C_r^-(q_s)$ correspond to the left forward clothoid turn 111, a left backward clothoid turn, a right forward clothoid turn, and a right backward clothoid turn, respectively. Note that a clothoid turn, enclosed by its corresponding CC circle, always enters and leaves the corresponding CC circle in the direction which forms a $\mu$ angle with tangent vectors at the entry and exit points.

Notably, each CC circle has exactly the same center as the circular arc of its respective clothoid turn. For instance, $\Omega$, the center of the CC circle 121 $C_l^+(q_s)$, coincides with the center of the circular arc which is tangential to the vehicle orientation at $q_1$. Its coordinates are given by $$\begin{pmatrix}x_\Omega\\y_\Omega\end{pmatrix}=\begin{pmatrix}x_1-\kappa_{max}^{-1}\sin\theta_1\\y_1+\kappa_{max}^{-1}\cos\theta_1\end{pmatrix}. \quad (5)$$

For fixed $\kappa_{max}$ and $\sigma_{max}$, the CC circle radius and $\mu$-angle are given by $$\begin{pmatrix}R_\Omega\\\mu\end{pmatrix}=\begin{pmatrix}\sqrt{x_\Omega^2+y_\Omega^2}\\\arctan\frac{x_\Omega}{y_\Omega}\end{pmatrix}, \quad (6)$$

where $\mu$ is the angle between the vehicle orientation and a tangent vector of the CC circle 121 at $q_s$.

In one embodiment, one can perform the sub-optimal CCPP using $\mu$-tangency conditions, which determine combination of clothoid turns and lines. There are three possible combinations in continuous curvature paths fitting the driving patterns in FIG. 1C: SC,CC,C|C. Accordingly, there are three types of $\mu$-tangency conditions.

Figure 1F:
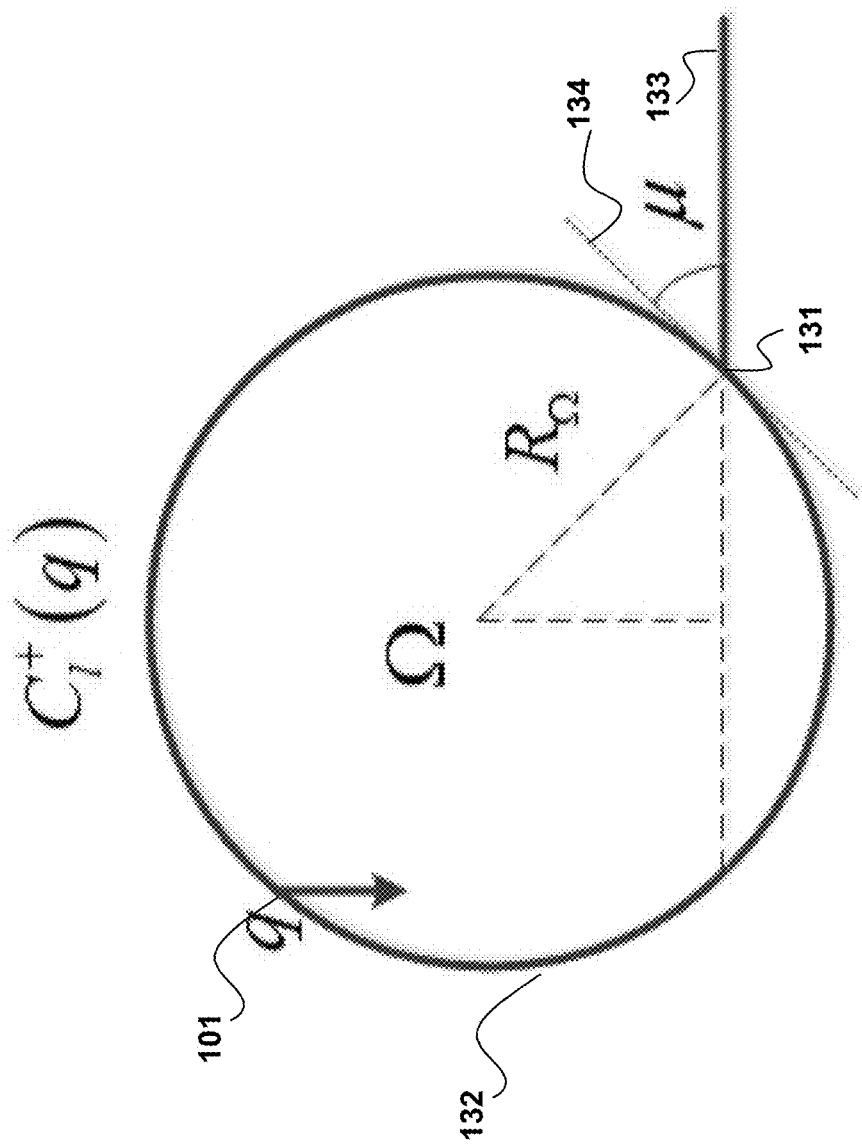
FIG. 1F illustrates an example of $\mu$-tangency condition used by some embodiments.

FIG. 1F illustrates SC μ-tangency condition between a line 133 and a clothoid turn, which uniquely determines a CC circle 132. The clothoid turn begins with 101, and transits to the line 133 at $q_1$ 131. The SC μ-tangency condition between the clothoid turn and the line 133 is that an angle between a tangent vector 134 of the CC circle 132 at $q_1$ 131 and the line 133 is μ.

Figure 1G:
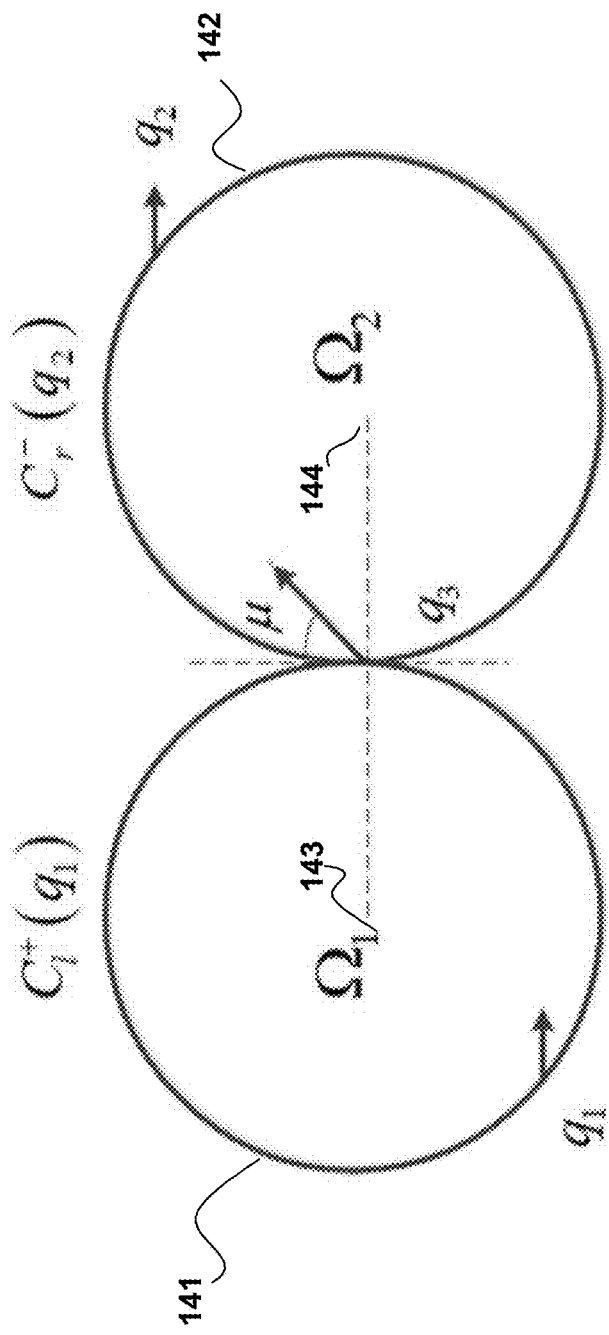
FIG. 1GA illustrates $\mu$-tangency conditions between a left forward clothoid turn and a right forward clothoid turn.
Figure 1G:
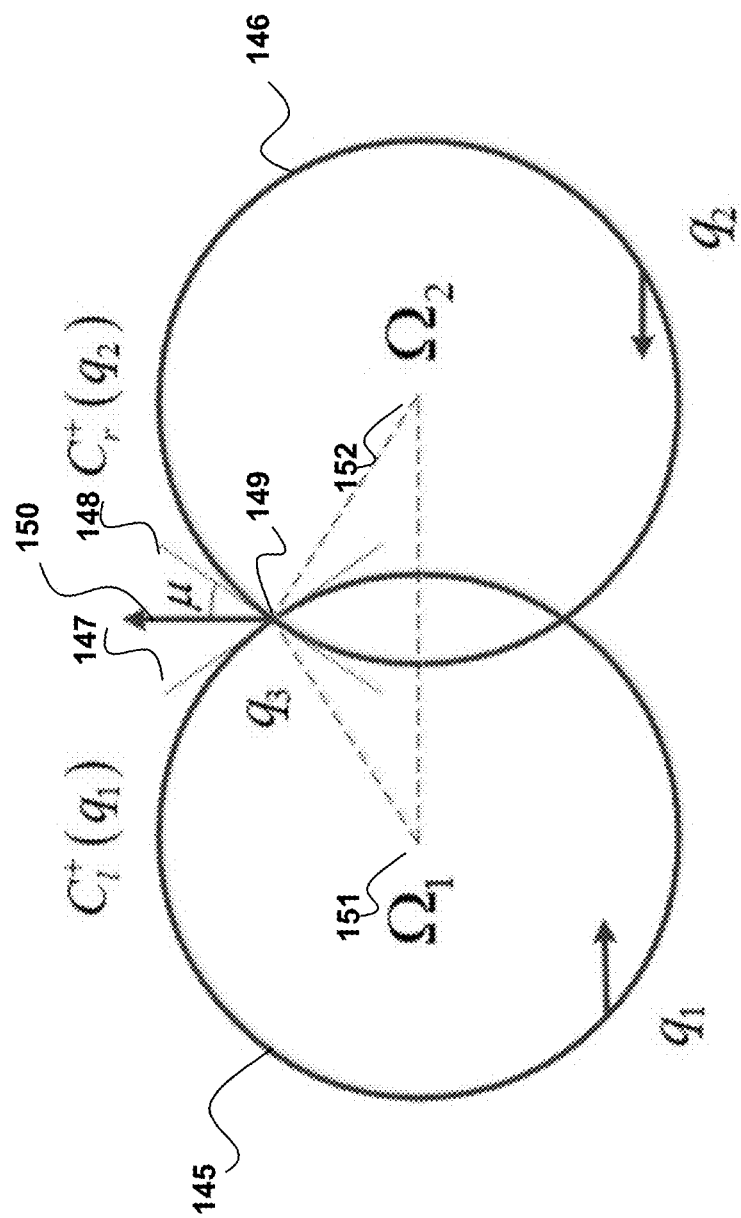

FIG. 1GA illustrates CC μ-tangency conditions between a left forward clothoid turn and a right forward clothoid turn, corresponding to CC circles 141 and 142, respectively. The CC μ-tangency conditions specifies 1. the CC circles 141 and 142 have to be tangential;
2. a distance $L(\Omega_1 \Omega_2)$ between centers 143 and 144 of the CC circles 141 and 142 is equal to $2R_\Omega$.

FIG. 1GB illustrates C|C μ-tangency conditions between a left forward clothoid turn and a right backward clothoid turn, corresponding to CC circles 145 and 146, respectively. The C|C μ-tangency conditions specifies that 1. the CC circles 145 and 146 intersect with each other, and at an intersecting configuration 149, tangent vectors 147 and 148, of the CC circles 145 and 146, respectively, form angles of μ with respect to an orientation 149 of the vehicle at 149;
2. a distance $L(\Omega_1 \Omega_2)$ between centers 151 and 152 of the CC circles 145 and 146 should be $2R_\Omega \cos \mu$.

Some embodiments perform real-time continuous curvature (CC) path planning for vehicles and other robots considering obstacle avoidance. Some embodiments are motivated by the fact that Reeds-Shepp's (RS) based path planning remains unmatched in terms of computation efficiency and reliability when compared with various CC path planning results that consider obstacle avoidance. However, the RS path is a discontinuous curvature path. To that end, some embodiments disclose methods to achieve almost equivalent computational efficiency and reliability as RS path planning by post-processing RS paths. In some implementations, the post-processing resorts to geometric interpretation of μ-tangency conditions, and thus not only allows a majority of planning work done offline, but also enables development of convergence guaranteed algorithms.

Figure 2A:
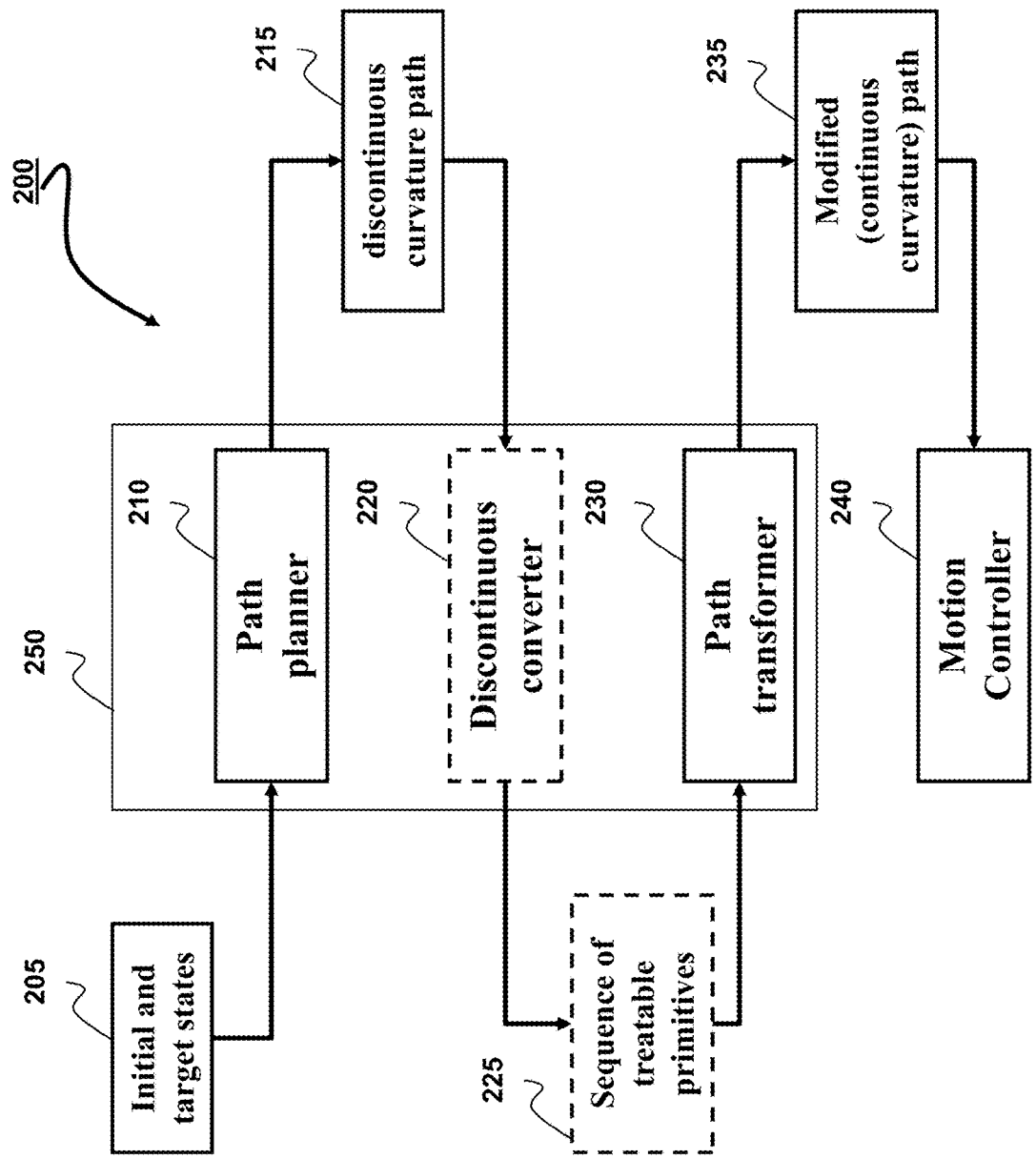
FIG. 2A shows a block diagram of a system including a motion planner for controlling a motion of a vehicle from an initial state to a target state according to some embodiments.

FIG. 2A shows a block diagram of a system 200 including a motion planner 250 for determining a motion of a vehicle from an initial state to a target state according to some embodiments. The system includes a path planner 210 to determine a discontinuous curvature path 215 connecting the initial state with the target state by a sequential composition of driving patterns. The path planner 210 uses principles employed by the RS based path planning to produce such a discontinuous curvature path that is collision-free within a tolerance envelope centered on the discontinuous curvature path.

Some embodiments are based on recognition that some, but not all patterns of the discontinuous curvature path can be replaced with continuous curvature segments remaining within the tolerance envelope. These embodiments are based on analysis of four types of discontinuous curvature junctions (DCJs): SC,CS,CC,C|C, with S, C, and | representing straight line segments, circular arcs, and change of velocity direction, respectively. L and R specify left and right turns with + or − denoting forward or backward motion, respectively.

Based on this analysis, some embodiments identify, i.e., determined offline, different patterns of elementary paths that can be replaced with corresponding patterns forming continuous curvature segments. That is, finding a continuous curvature path staying within a specified neighborhood of paths in these predetermined patterns is guaranteed. Such a predetermined pattern of elementary paths that can be replaced with continuous curvature segment is referred herein as "treatable primitive." For example, a sequence of a straight-line segment connected to a first arc segment connected to a second arc segment forms a treatable primitive that can be replaced with a combination of lines, clothoid, and clothoid turns forming a continuous curvature segment. Similarly, a sequence of a first arc segment connected to a second arc segment connected to a straight-line segment also forms a treatable primitive that can be replaced with a pair of clothoid turns and a line if necessary.

The types of the treatable primitives can vary, but in order to speed up the online calculation of the CC path, the embodiments predetermine those treatable primitives and corresponding structure of the continuous curvature segments. For example, a sequence of an even number of circular arc segments connected to the straight-line segment can be replaced with a sequence of the even number of clothoid turns. The parameters of the clothoid turns forming the continuous curvature segment are determined online, but because the structure of the continuous curvature segment is predetermined, some embodiments simplifies the online computation of the parameters.

To that end, the system 200 includes a path transformer 220 configured to locate and replace at least one treatable primitive in the discontinuous curvature path with a corresponding continuous curvature segment to form a modified path remaining within the tolerance envelope, and a controller 240 to control the motion of the vehicle according to the modified path 235.

In one embodiment, the path transformer converts the treatable primitives forming only part of the discontinuous curvature path 215. Thus, in that embodiment, the modified path 235 is also discontinuous but with less discontinuous curvature junctions then the path 215. In alternative embodiments, the system 200 aim to produce the discontinuous curvature path forms only by treatable primitives, such that the modified path 235 is a continuous curvature path.

For example, in one embodiment, the path planner 210 is a basic Reeds-Shepp (RS) path planner forming the discontinuous curvature path using a combination of a straight-line segment and a circular arc tangentially connected at discontinuous curvature junctions. This embodiment simplifies the implementation of the path planner 210, however, does not guarantee that the discontinuous curvature path 215 includes only treatable primitives. To that end, this embodiment also includes a converter 225 to convert the sequential composition of driving patterns of the discontinuous curvature path 215 into another discontinuous curvature path which is formed by a sequence of treatable primitives 225. For example, the converter 220 can insert a new straight-line segment in the path 215 to form the path 225. In such a manner, after the path transformer 230 transforms path 225, the modified path 235 is a continuous curvature path. Examples of the operations of the converter 220 are provided below.

Additionally, or alternatively, the path planner 210 can be a modified RS path planner that produces such a discontinuous curvature path 215 that is already formed only by a sequence of treatable primitives. For example, in one embodiment, the path planner imposes a constraint on the discontinuous curvature path requiring at least one of an initial and a final segment of the discontinuous curvature path being a straight-line segment.

Figure 2B:
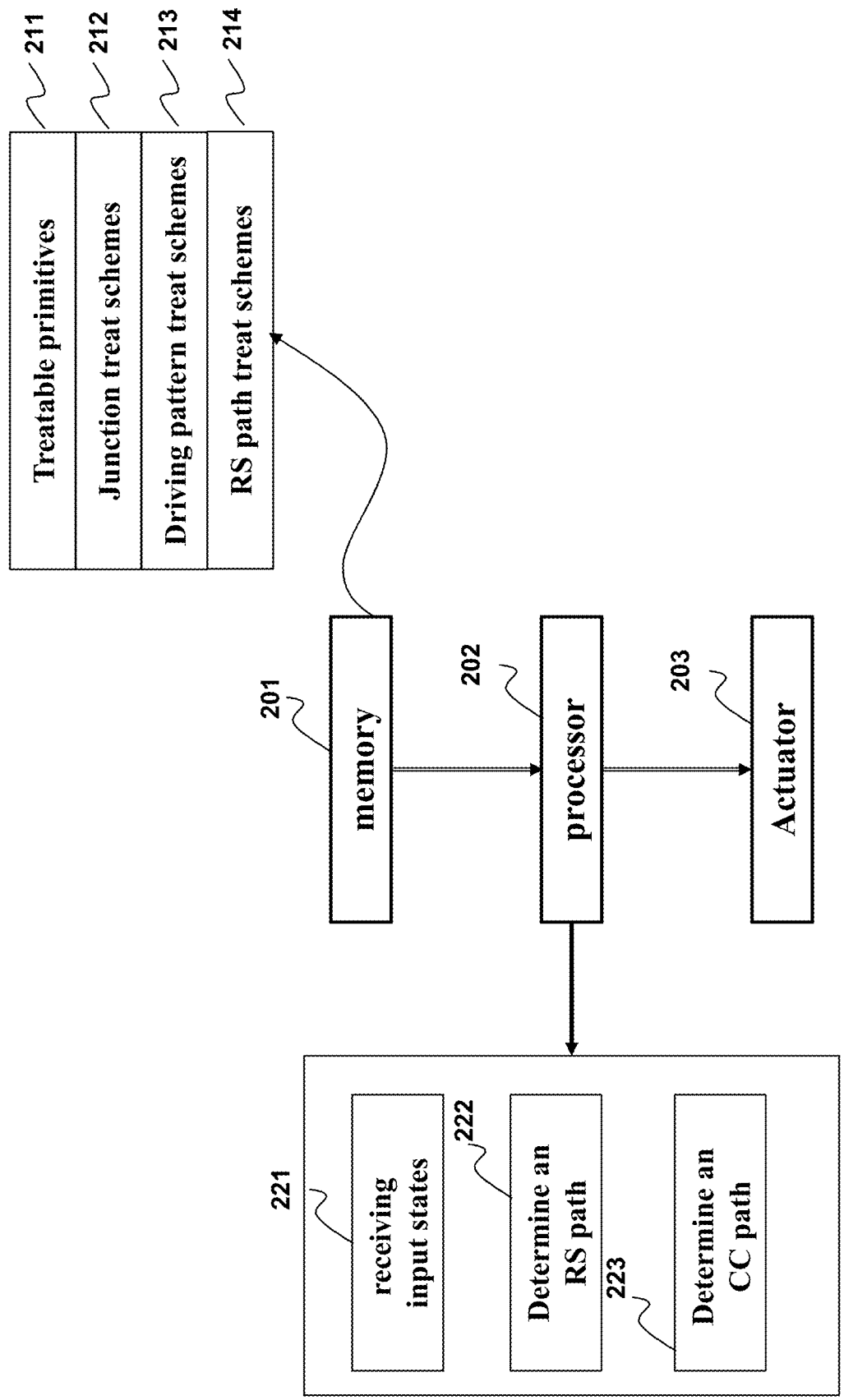
FIG. 2B shows a system diagram of the system of FIG. 2A according to some embodiments.

FIG. 2B shows a system diagram of the system 200 of FIG. 2A according to some embodiments. The system 200 can includes a memory 201 that stores a finite number of treatable primitives 211, discontinuous curvature junction (DCJ) treat schemes 212, driving pattern treat schemes 213, and RS path treat schemes 214. All these schemes are present in the memory in the form of codes. A processor 202 implements the motion planning 250, on the basis of inputs states 221 indicating initial and final configurations of the vehicle, determines an RS path 222, and determine a CC path 223. An actuator 203, e.g., a motor, controls the motion of the vehicle according the CC path.

Some embodiments post-processes discontinuous curvature paths to generate a CC path, which not only satisfies the CC property, but also stays inside a neighborhood of the discontinuous curvature path to maintain obstacle clearance so that collision detection for the CC path can be avoided. In order to ensure the CC property. Some embodiments exploit the geometric insights casted by μ-tangency conditions to process discontinuous curvature paths. To that end, in some embodiments, the path transformer 230 determines parameters of the continuous curvature segment to satisfy a μ-tangency constraint.

Figure 3A:
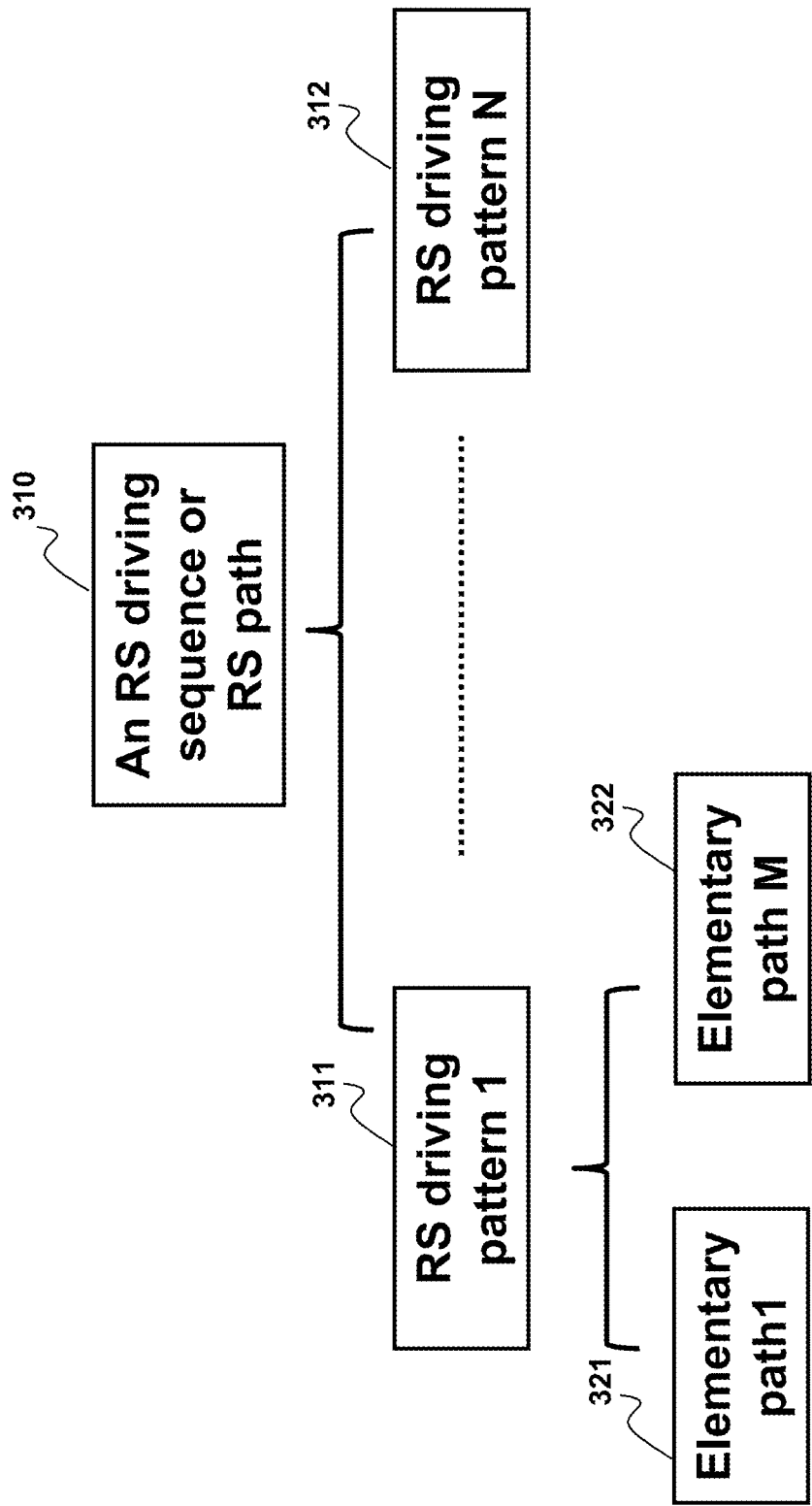
FIG. 3A shows a structure of a discontinuous curvature path determined by a path planner according to some embodiments.

FIG. 3A shows a structure of discontinuous curvature path 215 determined by path planner according to some embodiments. In those embodiments, the discontinuous curvature path is an RS path 310 formed by one or a sequence of multiple RS driving patterns 311, 312. Example of RS driving patterns 311-312 include patterns 199 shown in FIG. 1C. As can be seen on FIG. 1C, each RS driving pattern includes a sequence of elementary paths 321-322. Path planner selects the elementary paths from a finite set {C,S}, which represents a circular arc and line segment, respectively.

FIG. 3B shows a table 330 with examples of different RS driving patterns determined by different embodiments. For example, one embodiment determines basic patterns 332 of the RS path. The patterns 332 does not guarantee that the RS path formed by these patterns includes only treatable primitives. Alternatively, some embodiments produce patterns 334, 336, and 336 by deliberately inserting an extra elementary path formed by a straight-line segment S. For example, one embodiment inserts a straight-line segment S in the front of driving patterns 332 to form the pattern 334. Another embodiment inserts a straight-line segment S at the end of driving patterns 332 to form the pattern 336. Yet another embodiment inserts a straight-line segment S at the end and at the beginning of driving patterns 332 to form the pattern 338. Modified RS path planners with insertion of S may simplify post-processing of resultant RS paths, and produce a continuous curvature path with less maneuvers.

Figure 4A:
FIG. 4A shows a table with examples of some predetermined pattern of elementary paths forming the treatable primitives.

FIG. 4A shows a table with examples of some predetermined pattern of elementary paths forming the treatable primitives 410. This example discloses a set of treatable primitives 410 {S,SCS,SCC,CCS,SC|C,C|CS}, which can be treated by one step of treating schemes used by some embodiments. As can be seen in this FIG. 4A, the patterns of the treatable primitives 410 starts and/or ends with a straight-line segment S. To that end, the patterns 334, 336, and 336 simplify locating treatable primitives in the discontinuous curvature path generated by the path planner.

Figure 4B:
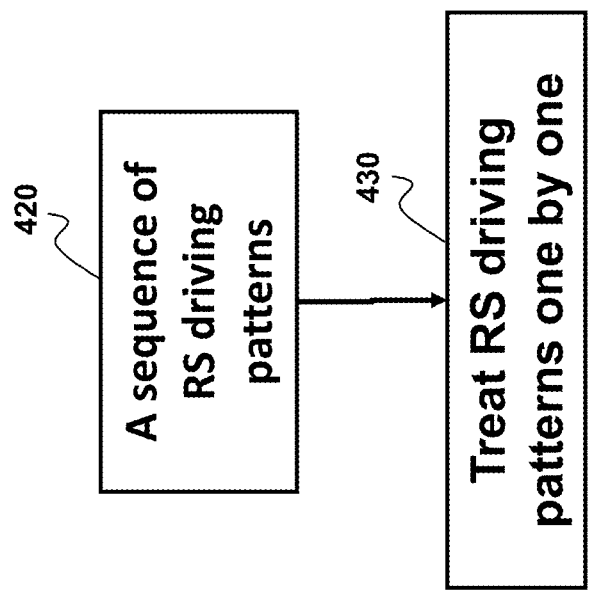
FIGS. 4B and 4C show examples of treating a discontinuous curvature path to form a sequence of treatable primitives according to different embodiments.
Figure 4C:
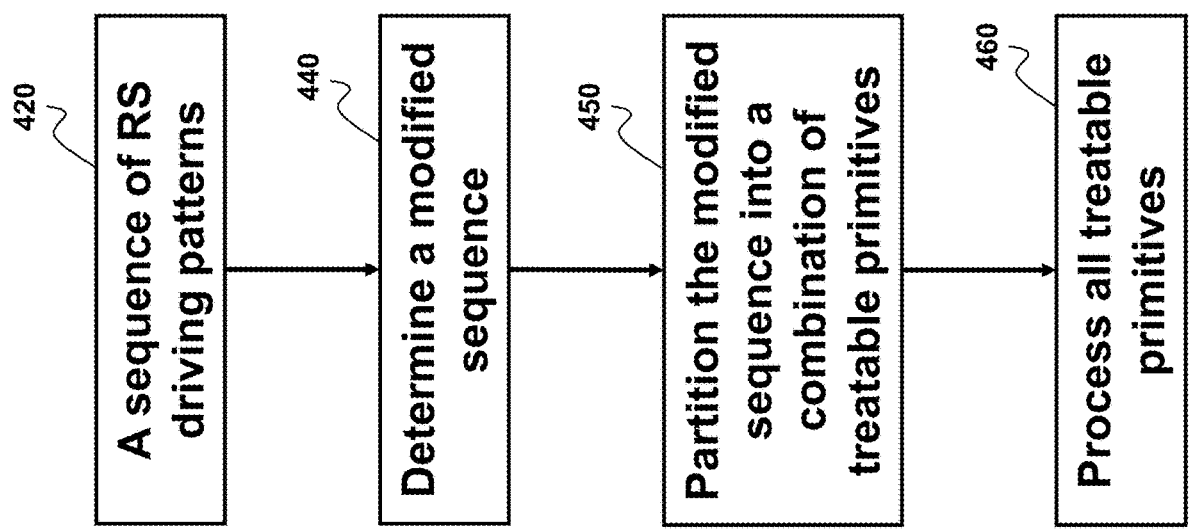

FIGS. 4B and 4C show examples of locating and treating the treatable primitives in the discontinuous curvature path according to different embodiments. For example, some embodiments generate a CC path by locating a finite set of treatable primitives in the sequence of patterns 420 forming discontinuous curvature path, which represents shortest RS driving patterns that can be converted into a CC driving pattern by one single step.

For example, the embodiment of FIG. 4B identifies 430 treatable primitives in each RS driving pattern of the RS path independently from each other. Conversely, the embodiment of FIG. 4C can process the entire RS path as a whole in order to locate the treatable primitives. This allows to modify the RS path in order to simplify the selection of treatable primitives. For example, this embodiment can modify 440 the RS path by inserting, splitting, or removing an elementary path from the sequence of patterns 440. Also, this embodiment can partition 450 the modified sequence of RS driving patterns into a new sequence of patterns, wherein each new pattern is a treatable primitive, and process 460 the new sequence to produce the continuous curvature path.

FIGS. 5A-G show different examples of converting a different RS pattern into a sequence of treatable primitives according to some embodiments.

FIG. 5A1 describes a treatment scheme for the RS driving pattern CSC 501a, which is first augmented to the driving pattern 502a by inserting and/or appending S. The word $S_a$ represents a line segment with certain length a. Given 502a, the S between two C are split into two $$S_{\frac{a}{2}}$$

503b. It is clear mat the driving pattern after treatment $$S_a | S_a C S_{\frac{a}{2}} S_{\frac{a}{2}} C S_a | S_a$$

consists of two treatable primitives S, and another two treatable primitives $$S_a C S_{\frac{a}{2}}$$

504a and $$S_{\frac{a}{2}} C S_a$$

505a.

FIG. 5A2 presents a treatment scheme for the RS driving pattern SCSC 511a, which is first augmented to the driving pattern 512a, by appending a driving word S in the end. The driving pattern 512a is further processed by splitting a second S into two $$S_{\frac{a}{2}}$$

to give 513a. It is clear that the modified driving pattern 513a consists of treatable primitives SCS 514a, SCS 515a, and an S.

FIG. 5A3 teaches a treatment scheme for the RS driving pattern CSCS 521a, which is first augmented to the driving pattern 522a, by appending a driving word S in the beginning. The driving pattern 522a is further processed by splitting a third S into two $\frac{S_a}{2}$ to give 523a. It is clear that the modified driving pattern 523a includes treatable primitives SCS 524a, SCS 525a, and an S.

FIG. 5A4 depicts a treatment scheme for the RS driving pattern SCSCS 531a, which is processed by splitting a second S into two $\frac{S_a}{2}$ to give 532a. It is clear that the modified driving pattern 532a consists of treatable primitives SCS 532a and SCS 534a.

Figure 5B:
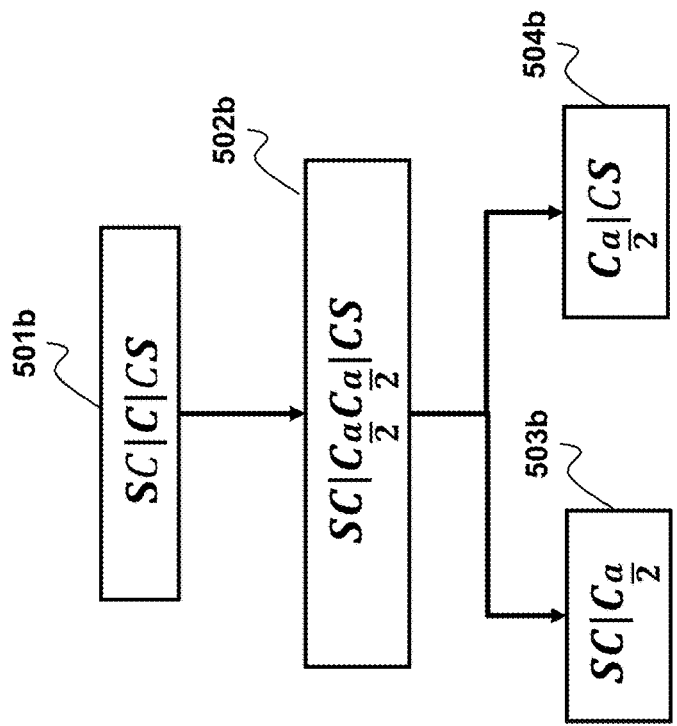

FIG. 5B discloses a treatment scheme for the RS driving pattern SC|C|CS 501b, which is processed by splitting a second C into two $\frac{C_a}{2}$ to give 502b. It is clear that the modified driving pattern 502b consists of treatable primitives SC|C 503b and C|CS 504b.

Figure 5C:
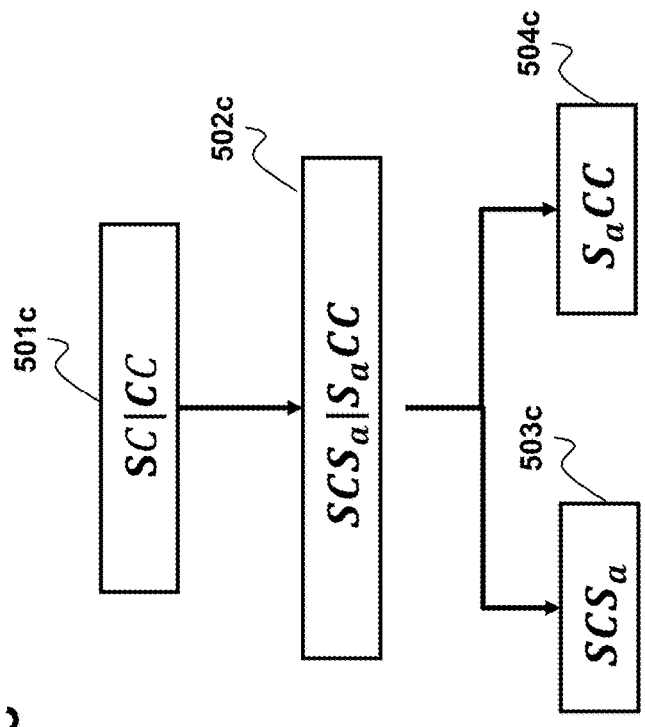

FIG. 5C discloses a treatment scheme for the RS driving pattern SCC|C 501c, which is augmented by inserting S behind a first driving word C to give 502c. It clear that the modified driving pattern 502c consists of treatable primitives SCC 503c and SCCS 504c.

Figure 5D:
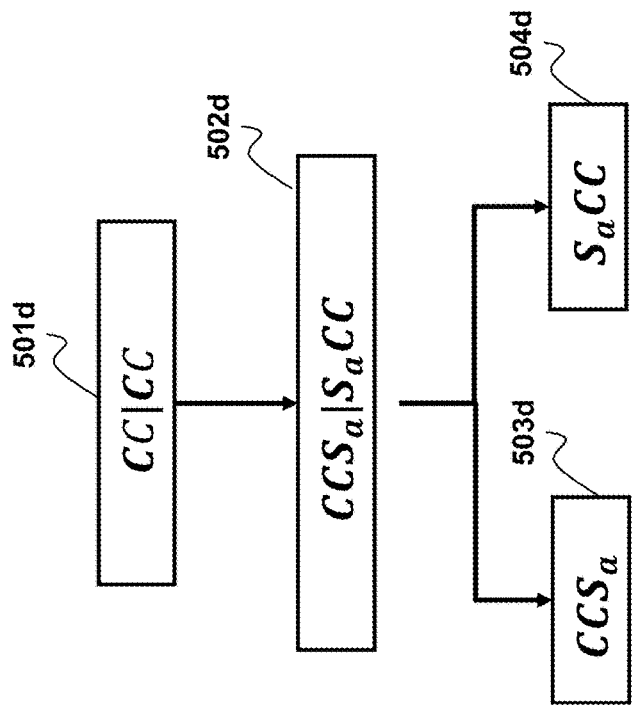

FIG. 5D discloses a treatment scheme for the RS driving pattern CC|CC 501d, which is processed by inserting S between a second and a third C to give a modified driving pattern 502d. It is clear that the modified driving pattern 502b consists of treatable primitives CCS 503d and SCC 504d.

Figure 5E:
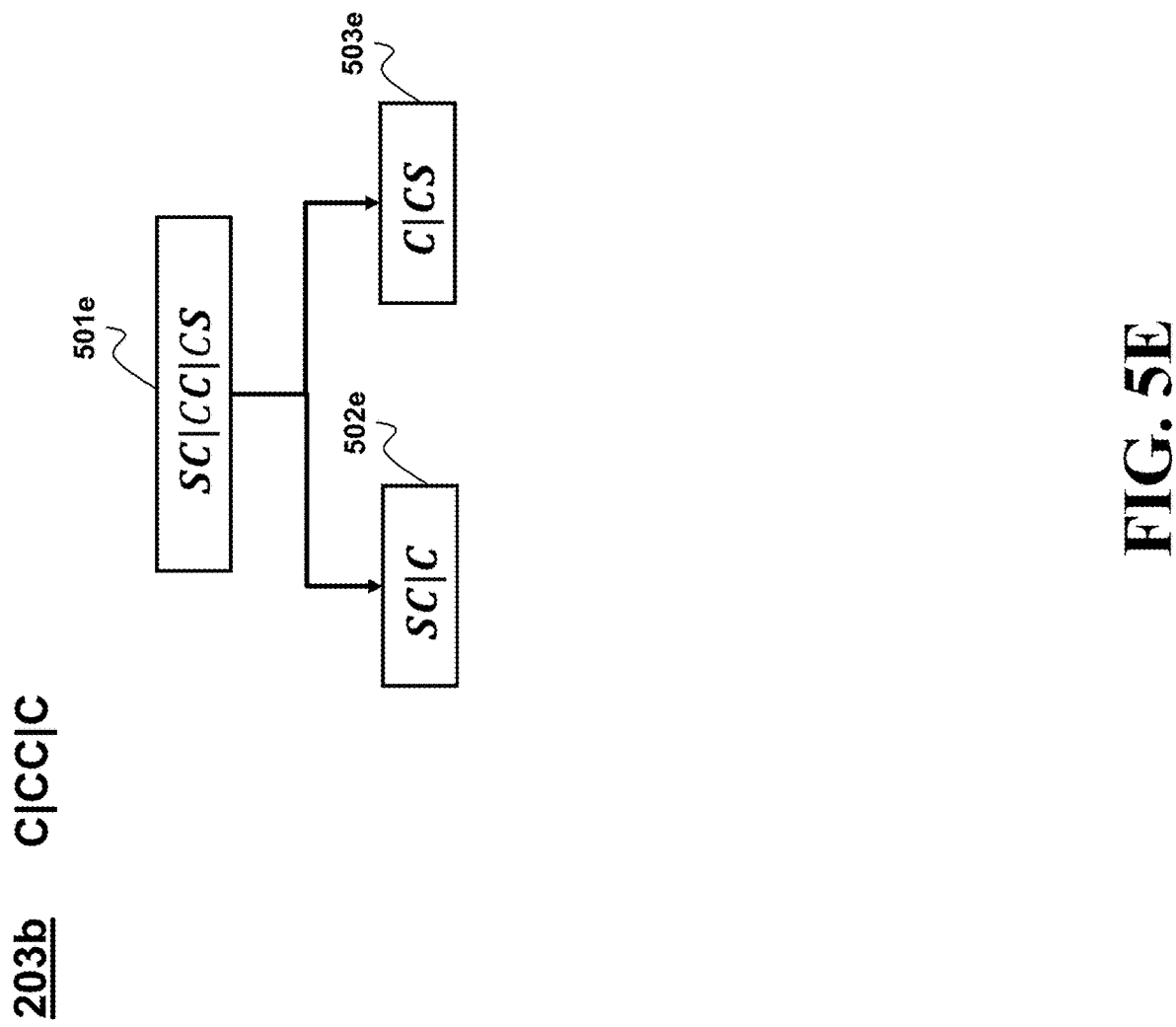

FIG. 5E discloses a treatment scheme for the RS driving pattern SC|CC|CS 501e, which consists of treatable primitives SC|C 503e and C|CS 504e.

Figure 5F:
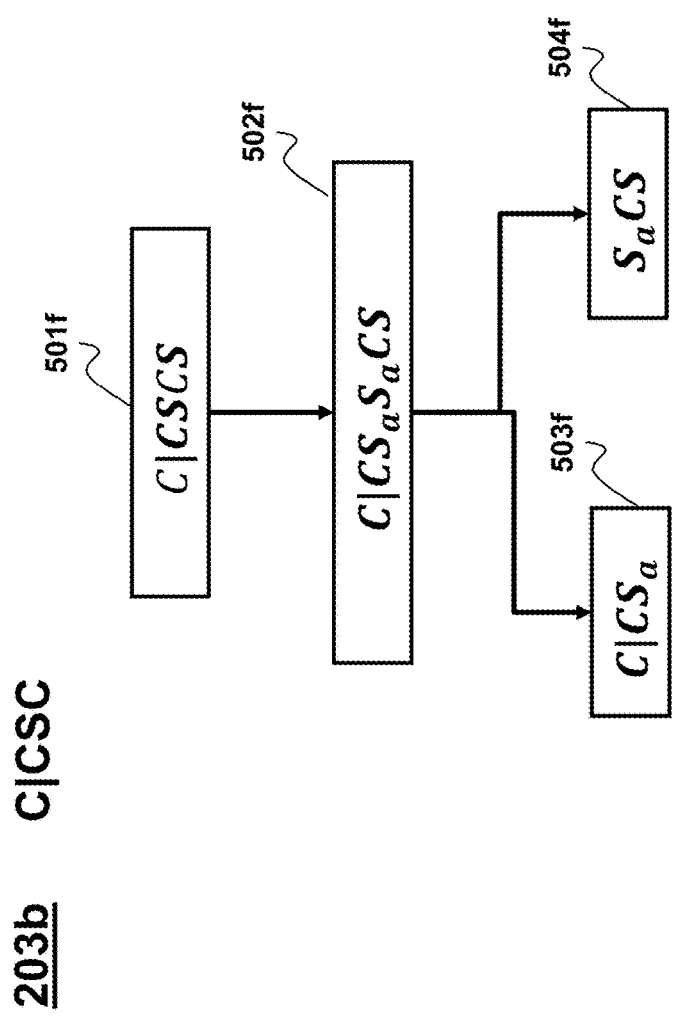

FIG. 5F discloses a treatment scheme for the RS driving pattern C|CSCS 501f, which is processed by splitting a first S into two $\frac{S_a}{2}$ to give 502f. It is clear that the modified driving pattern 502f consists of treatable primitives C|CS 503f and SCS 504f.

Figure 5G:
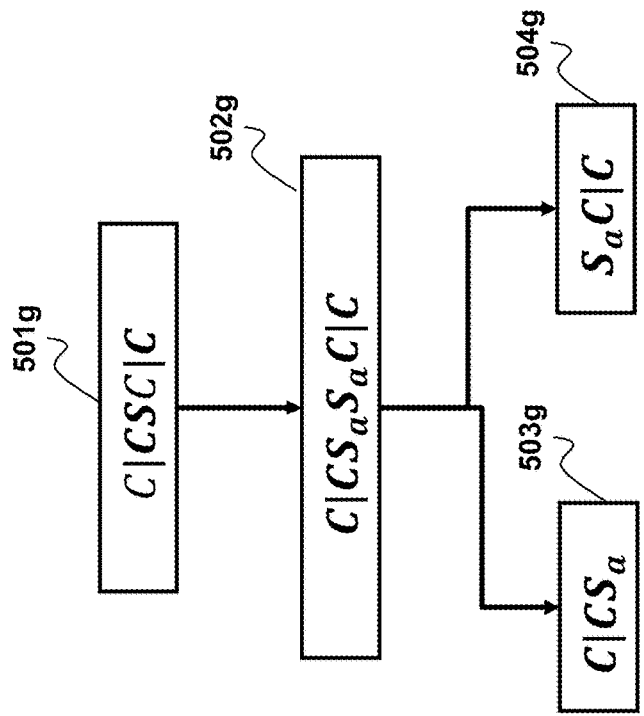

FIG. 5G discloses a treatment scheme for the RS driving pattern C|CSC|C 501g, which is processed by splitting a first S into two $\frac{S_a}{2}$ to give 502g. It is clear that the modified driving pattern 502g consists of treatable primitives SC|C 504g and C|CS 503g.

Figure 6:
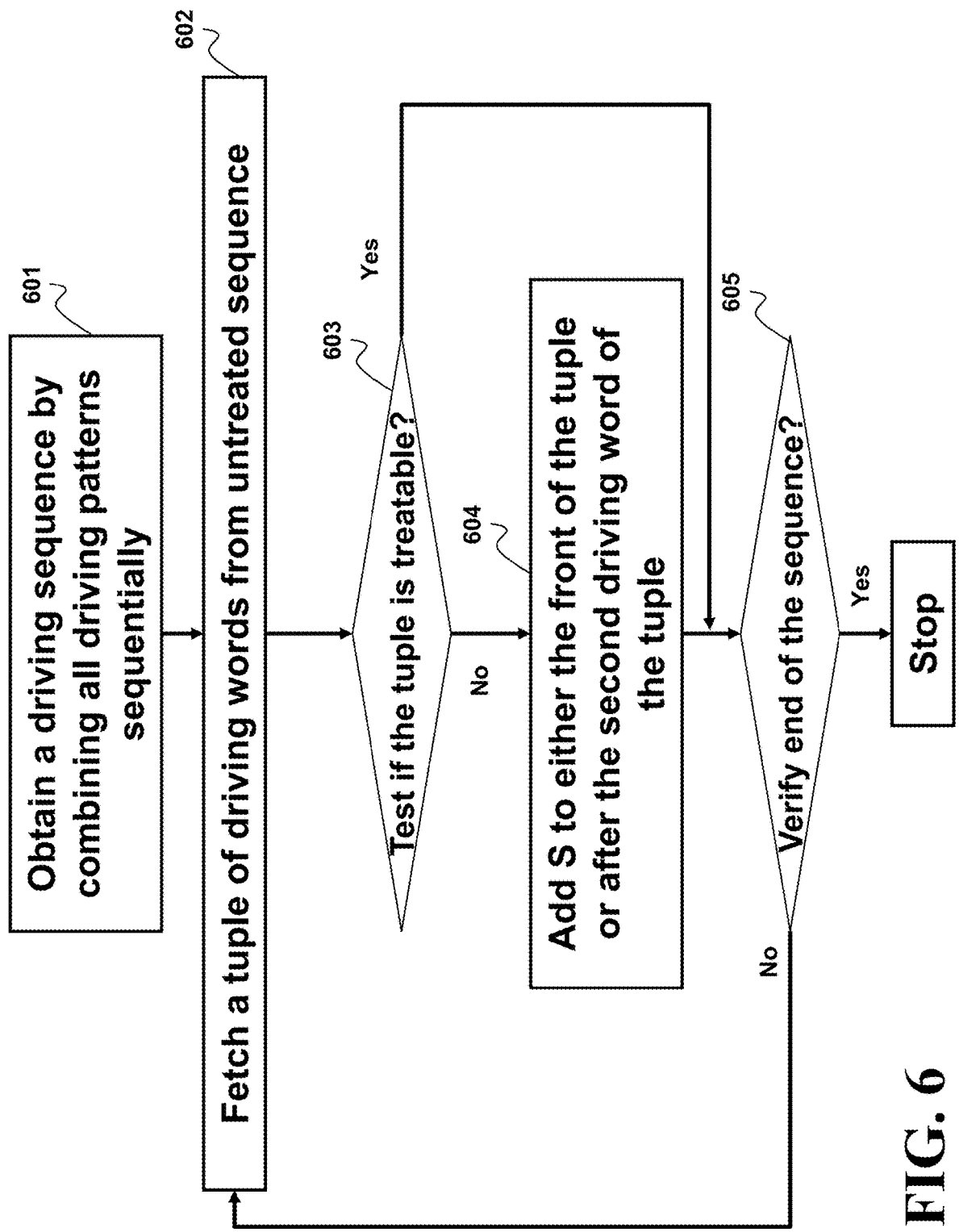
FIG. 6 shows a flow chart of a method for processing a sequence of driving patterns of a discontinues curvature path according to one embodiment.

FIG. 6 shows a flow chart of a method for processing a sequence of driving patterns 601 forming a discontinues curvature path according to one embodiment. In this embodiment, the converter 220 iteratively tests each tuple of elementary paths forming the discontinuous curvature path for being a treatable primitive and inserts a new straight-line segment into a tuple not representing the treatable primitive. For example, the driving sequence, always untreated in the beginning, is parsed 602, where a first tuple of driving words in the untreated driving sequence are fetched to test whether it belongs to the set of treatable primitives or not 603. If it does, the rest of the driving sequence will be the new untreated driving sequence, otherwise, the fetched tuple is processed by adding S to the front the tuple or after the second driving word of the tuple to yield a treatable primitive; and the new untreated driving sequence includes the last word of the tuple, followed by the old untreated driving sequence. If the whole driving sequence has been treated, the treating process stops; otherwise, the above steps fetching 602, testing 603, adding 604, and verifying 605 are repeated.

Figure 7A:
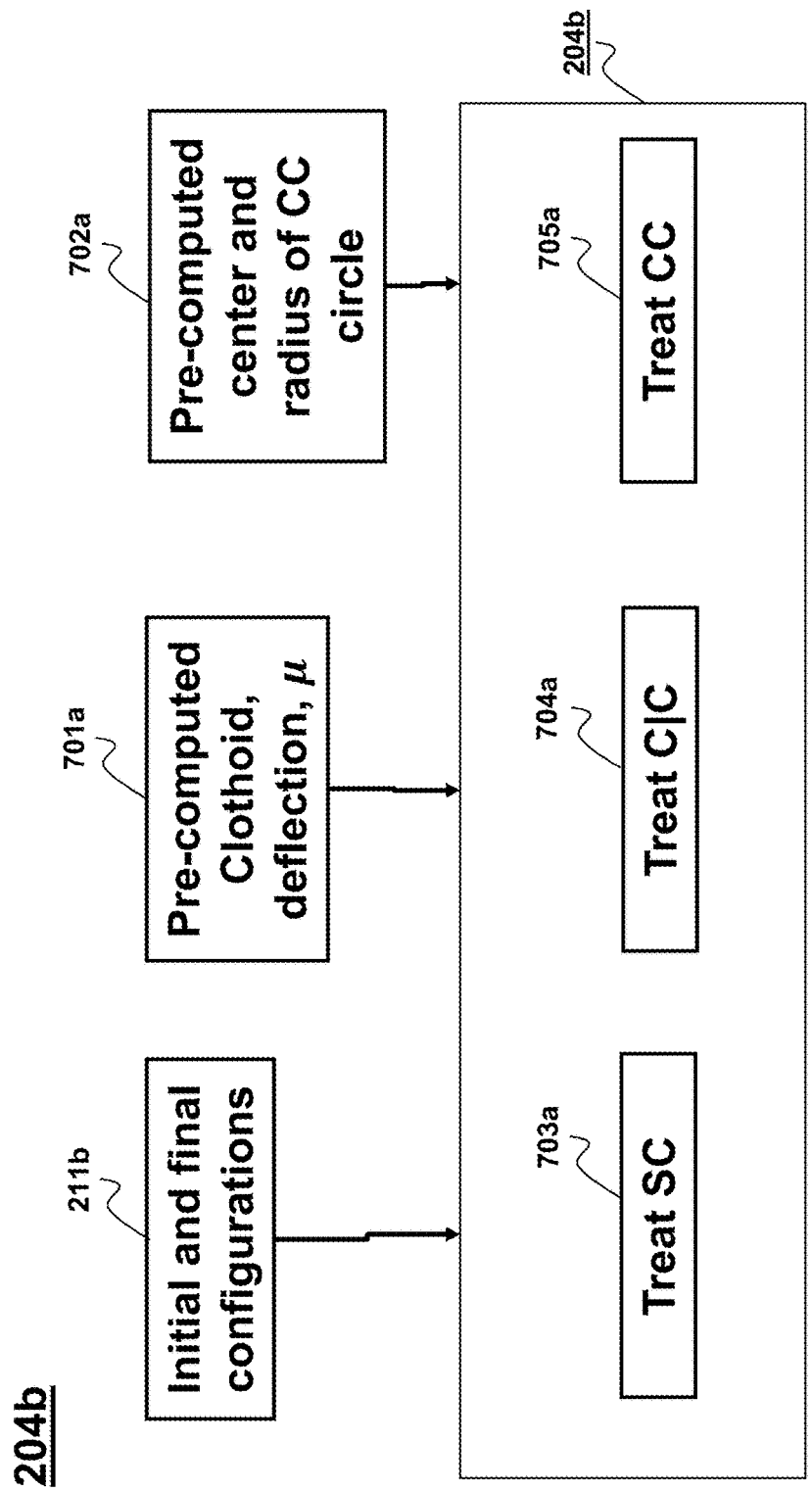
FIG. 7A shows a schematic of discontinuous curvature junction (DCJ) treating schemes used by one embodiment.

FIG. 7A shows a schematic of discontinuous curvature junction (DCJ) treating schemes used by one embodiment. These schemes lead to identification of treatable primitives. Classes of RS driving patterns in FIG. 1C reveal that DCJs occur at connections among straight line segments and circular arcs; specifically, DCJs can generally be categorized as SC, CS, CC and C|C patterns. Accordingly, DCJ treat schemes contain the treatment of SC 703a, C|C 704a, and CC 705a.

In some embodiments, a clothoid satisfying system dynamics (1) for a pair of fixed $\kappa_{max}$ and $\sigma_{max}$, is pre-computed and stored in memory 701a, and can be reused online to treat DCJs. Similarly, centers of clothoid circles and radius of clothoid turns 702a corresponding a clothoid starting at $q_s$ can also be computed offline and stored in memory for online use.

FIGS. 7B1, 7B2, 7B3, and 7B4 show schematic of treating a discontinuous curvature junction SC to form a continuous curvature junction according to one embodiment. The discontinuous curvature junction SC corresponds to a transition between a line and a circular arc. By adopting an appropriate coordinate framework, this corresponds to solve the following problem.

Problem 2 Let a simple RS driving pattern $P_{RS}^{SC}$ connecting an initial configuration $q_0=(x_0,0,0,0)$ 701b and a final configuration $q_f=(\kappa_{max}^{-1} \sin \theta, \kappa_{max}^{-} \sin \theta, \theta, \kappa_{max})$ 799b consist of [(i)]
1. A line segment S 711b described by $-\infty < x_0 \leq x \leq 0$ and y=0;
2. A circular arc C 712b, which is tangent to S at the origin (0,0) 713b. The radius and angle of C are given by $\kappa_{max}^{-1}$ and $\theta$, respectively.

Construct a continuous curvature path $P_{CC}$ connecting $q_0$ and $q_f$ which remains in $B(P_{RS}^{SC}, \varepsilon)$ while satisfying conditions (i)-(ii) in Problem 1.

A simple SC RS driving pattern is depicted in FIG. 7B1. Given a value of $\sigma_{max}$ such that $\theta > 2\delta_c$, the following SC transition scheme guarantee to make CC connection between S and C (see FIG. 7B-1 and FIG. 7B-2 for details)
1. A forward straight line segment that starts from the initial configuration $q_0=(x_0,0,0,0)$ 701b and ends at the configuration $q_s=(x^*,0,0,0)$ 702b with $x_0 \leq x^* \leq 0$.
2. A forward right clothoid turn (CT) that starts from the configuration $q_s=(x^*,0,0,0)$ 702b and ends at $q_1=(x_1,y_1,\delta,0)$ 703b with a deflection $\delta<0$;
3. A forward left CT with a deflection $-\delta$ that starts from $q_1$ 703b and ends at a configuration $q_2=(x_2,y_2,0,0)$ 704b.

4. A forward left clothoid that connects $q_2$ 704b and $q_3=(x_3,y_3,\delta_c,\kappa_{max})$ 705b, such that the point $(x_3,y_3) \in C$.

The following procedure can be followed to determine parameters in the SC treating scheme, i.e., $q_s,q_1,q_2$.

1. As depicted by FIG. 7B-2, both the CC Circle $C_l^+(q_2)$ 717b and the circular arc C 712b share the same center. Hence, $\Omega_3=(0,\kappa_{max}^{-1})$. Coordinates of $q_2$ are then computed by $$q_2 = \begin{pmatrix} x_2 \\ y_2 \\ \theta_2 \\ \kappa_2 \end{pmatrix} = \begin{pmatrix} R_\Omega \cos(-\frac{\pi}{2}-\mu) \\ \kappa_{max}^{-1} + R_\Omega \sin(-\frac{\pi}{2}-\mu) \\ 0 \\ 0 \end{pmatrix}. \quad (7)$$

2. Considering that the configuration $q_2$ is the end configuration of the forward left CT, one can immediately determine the center $\Omega_2$ of the CC Circle $C_l^{-1}(q_2)$.
3. For a certain $x^*$, the CC circle $C_r^+(q_s)$ has a center $\Omega_1(x^*)$, which is uniquely defined by $x^*$. On the other hand, the CC circle $C_r^+(q_s)$, corresponding to the first right CT starting from $q_s$, should be tangent to $C_l^-(q_2)$. Therefore, $x^*$ can be determined by solving the following nonlinear equation $$P\Omega_1-\Omega_2 P = 2R_\Omega,\ -M \le x^* < 0. \quad (8)$$

4. With $x^*$, $\Omega_1=(x_{\Omega_1},y_{\Omega_1})$ and $\Omega_2=(x_{\Omega_2},y_{\Omega_2})$, we compute the auxiliary angle $\alpha$ as follows:

$$\alpha = \arctan\left(\frac{y_{\Omega_2}-y_{\Omega_1}}{x_{\Omega_2}-x_{\Omega_1}}\right).$$

The deflection of the two CTs are given by $\delta$ and $-\delta$ accordingly, where $\delta=\alpha-\pi/2+\mu$. The length of the straight line segment is given by $x^*-x_0$.

The relationship between the CC Circles 715b, 716b, 717b is illustrated in FIG. 7B2. Previously-established computation procedure can be summarized as a CCP-SC method described in FIG. 7B3.

The CCP-SC method takes the initial configuration $q_0$ and the final configuration $q_f$, along with the error bound $\varepsilon$, as the inputs. The initial design parameter $\sigma_{max}^0$ is selected in such a way that $\theta > 2\delta_c$ is satisfied. First, the CCP-SC algorithm computes (lines 2 to 9) the appropriate $\sigma_{max}$ such that $|y_2| \le \varepsilon$ to guarantee that $P_{CC} \subseteq B(P_{RS},\varepsilon)$. After obtaining $\sigma_{max}$, the CCP-SC algorithm computes (lines 10 to 14) the corresponding $x^*$. As explained in the computation procedure, $x^*$ should satisfy both Equation (8) and the path constraint $x_0 < x^* < 0$. Some implementations reduce (8) to the equation in Line 13 based on simple geometric analysis. Once a proper $x^*$ is obtained by solving the equation, the iteration loop terminates and the CCP-SC algorithm computes and outputs the CC path $P_{CC}$ accordingly (lines 15 to 16); otherwise, the method increases the value of $\sigma_{max}$ and updates the value of $x^*$.

FIG. 7B4 plots a solution of the proposed SC treat scheme for a specific example.

FIGS. 7C1, 7C2, 7C3, and 7C4 show schematic of treating discontinuous curvature junction CC to form a continuous curvature junction according to one embodiment. The discontinuous curvature junction CC is formed by juncture between two circular arcs. By adopting an appropriate coordinate framework, this corresponds to solve the following problem.

Problem 3 Let $P_{RS}^{CC}$ be a CC type of RS path starting from the initial configuration $q_0=(0,0,0)$ 701c and ending at $q_f$ 799c. $P_{RS}^{CC}$ consists of 1. A circular arc $C_1$ 711c which starts from the origin and ends at A 713c. The radius and angle of $C_1$ are given by $\kappa_{max}^{-1}$ and $\theta_1$, respectively.
2. A circular arc $C_2$ 712c ending at the final configuration $q_f=(x_f,y_f,\theta_f)$ 799c which is tangent to $C_1$ at A, moves in the same direction as $C_1$, and has the radius and angle given by $\kappa_{max}^{-1}$ and $\theta_2$, respectively.

Construct a continuous curvature path pattern $P_{CC}$ to achieve the following requirements: (i) $P_{CC}$ connects the null-curvature augmented configurations $q_0'=(0,0,0,0)$ and $q_f'=(x_f,y_f,\theta_f,0)$; (ii) $P \subseteq B(P_{RS}^{CC},\varepsilon)$; (iii) $P_{CC}$ satisfies conditions (i)-(ii) in Problem 1.

For illustration purpose, this invention assumes that $\theta_1 \in [0,\pi]$ (counterclockwise) and $\theta_2 \in [0,\pi]$ (clockwise). This scenario is depicted in FIG. 7C1. The centers of $C_1$ and $C_2$ are obtained as $$O_1 = \begin{pmatrix} 0 \\ \kappa_{max}^{-1} \end{pmatrix}, O_2 = \begin{pmatrix} 2\kappa_{max}^{-1}\sin\theta_1 \\ \kappa_{max}^{-1}2\kappa_{max}^{-1}\cos\theta_1 \end{pmatrix}.$$

Based on the coordinates of $O_1$ and $O_2$, the final configuration $q_f$ of the arc $C_2$ (hence $P_{RS}^{CC}$) is then obtained as $$q_f=(2\kappa_{max}^{-1}\sin\theta_1+\kappa_{max}^{-1}\sin(\theta_2-\theta_1),$$

$$\kappa_{max}^{-1}-2\kappa_{max}^{-1}\cos\theta_1+\kappa_{max}^{-1}\cos(\theta_2-\theta_1),\theta_1-\theta_2). \quad (9)$$

The embodiments proceeds to the construction of the desired $P_{CC}$ that connects $q_0'$ and $q_f'$. Solving Problem 3 is similar to computing a continuous curvature path that connects the configurations $q_0=(0,0,0,0)$ and $q_f$ (9). To this end, we propose a continuous curvature path pattern S|CC to solve Problem 3, where S and C denotes line segments and CT, respectively. As shown in FIG. 7C2, the proposed CC path is composed of:

1. S: a backward line segment that starts from $q_0$ 701c and ends at a configuration $q_1=(x^*,0,0,0)$ 702c with $\varepsilon \le x^* < 0$;
2. $CT_1$: a forward left CT with a deflection $\delta_1$ that starts from $q_1$ 702c and ends at a configuration $q_2=(x_1,y_1,\delta_1,0)$ 703c;
3. $CT_2$: a forward right CT with a deflection $\delta_2=\theta_1-\theta_2-\delta_1$ that starts from $q_2$ 703c and ends at $q_f$ 799c.

Given an appropriate $\sigma_{max}$, the following method can be employed to compute transition parameters $x^*$, $x_1$, $y_1$, $\delta_1$ and $\delta_2$.

1. With $CT_2$ ending at $q_f$ given by (9), we have a center $\Omega_2=(x_{\Omega_2},y_{\Omega_2})$ of a CC Circle $C_r^-(q_f)$ 716c.
2. Since $CT_1$ starts from $q_1$ 702c, a center $\Omega_1(x^*)$ of CC Circle $C_l^+(q_1)$ 715c is a vector-valued function of $x^*$.
3. CC Circles $C_l^+(q_1)$ 715c and $C_r^-(q_f)$ 716c must be tangent to each other. Towards this end, $x^*$ shall satisfy $$P\Omega_1(x^*)-\Omega_2 P = 2R_\Omega,\ x^*<0, \quad (10)$$

where $R_\Omega$ is given by (6).

4. Given $x^*$ solved from (10), $\Omega_1=(x_{\Omega_1},y_{\Omega_1})$ can be determined. Compute the auxiliary angle $\alpha$ as follows $$\alpha = \arctan\left(\frac{y_{\Omega_2} - y_{\Omega_1}}{x_{\Omega_2} - x_{\Omega_1}}\right).$$

The deflections of $CT_1$ and $CT_2$ are given by $\delta_1 = \alpha + \pi/2 - \mu$, and $\delta_2 = \theta_1 - \theta_2 - \delta_1$, respectively, while the length of the line segment is obtained as $|x^*|$.

Similarly, one embodiment can also use a CC|S path pattern to treat CC, which includes two CTs and a backward motion in a straight line segment. Due to its symmetry to the aforementioned S|CC path pattern, CC|S can also be computed efficiently in a similar manner.

The computation procedure of the S|CC path that connects $q'_0$ and $q'_f$ is summarized as the CCP-CC method in FIG. 7C3.

Similar to the CCP-SC method, the CCP-CC method takes $q_0$, $q_f$ and $\varepsilon$ as the inputs. Intuitively, the CCP-CC algorithm computes an appropriate $x^*$ in an iterative manner such that (10) can be satisfied. For such a purpose, at the k-th iteration step, the CCP-CC computes $R_\Omega$ and $\mu$ with respect to $\sigma_{max}^k = \sigma_{max}^0 + k\Delta\sigma$ (Lines 3 to 4). Next, the center $\Omega_2$ of $C_r^-(q_f)$ is obtained (Line 5). On the other hand, from a simple geometric reasoning, the center $\Omega_1$ of $C_l^+(q_1)$ can be obtained from $x^*$ and $\Omega_0$ of $C_l^+(q_0)$ (Lines 6-7). Based on the coordinates of $\Omega_1$, (10) can then be reduced to the equation presented in Line 8 of the CCP-CC algorithm. Solving this equation yields a valuation of $x^*$; and $x^*$ can be accepted whenever $|x^*| < \varepsilon$ (Lines 9-12). Afterwards, the desired $P_{CC}$ can be computed in terms of $x^*$ accordingly.

FIG. 7C4 plots a solution of the proposed CC treat scheme for a specific example.

FIGS. 7D1, 7D2, 7D3, and 7D4 show schematic of treating discontinuous curvature junction C|C to form a continuous curvature junction according to one embodiment. The discontinuous curvature junction C|C is formed by juncture between two circular arcs with a reverse movement. By adopting an appropriate coordinate framework, this corresponds to solve the following problem.

Problem 4 Let $P_{RS}^{C|C}$ be an RS path starting from the initial configuration $q_0 = (0,0,0)$ 701d that consists of
1. A circular arc $C_1$ 711d that starts from $q_0$ with the radius and angle of $C_1$ given by $\kappa_{max}^{-1}$ and $\theta_1$, respectively.
2. A circular arc $C_2$ 712d that is tangent to $C_1$ at point A 713d. The vehicle moves in the opposite direction as in $C_1$ until the final configuration $q_f = (x_f, y_f, \theta_f)$ 799d. The radius and angle of $C_2$ are given by $\kappa_{max}^{-1}$ and $\theta_2$, respectively.

Construct a continuous curvature path $P_{CC}$ such that: (i) $P_{CC}$ connects the null-curvature augmented configurations $q_0 = (0,0,0,0)$ and $q_f = (x_f, y_f, \theta_f, 0)$; (ii) $P \subseteq B(P_{RS}^{C|C}, \varepsilon)$; (iii) $P_{CC}$ satisfies conditions (i)-(ii) in Problem 1.

For clarity, this embodiment assumes without loss of generality that $\theta_1 \in [0,\pi]$ (counterclockwise) and $\theta_2 \in [0,\pi]$ (counterclockwise). Centers of circular arcs $C_1$ 711d and $C_2$ 712d, denoted as $O_1$ and $O_2$, respectively, are computed identically as the CC DCJ circumstance.

$$O_1 = \begin{pmatrix} 0 \\ \kappa_{max}^{-1} \end{pmatrix}, O_2 = \begin{pmatrix} 2\kappa_{max}^{-1}\sin\theta_1 \\ \kappa_{max}^{-1} - 2\kappa_{max}^{-1}\cos\theta_1 \end{pmatrix}.$$

As shown in FIG. 7D1, the RS path $P_{RS}^{C|C}$ ends at the configuration $q_f = (2\kappa_{max}^{-1}\sin\theta_1 - \kappa_{max}^{-1}\sin(\theta_1+\theta_2),$ $\kappa_{max}^{-1} - 2\kappa_{max}^{-1}\cos\theta_1 + \kappa_{max}^{-1}\cos(\theta_1+\theta_2), \theta_1+\theta_2).$ \hfill (11)

One embodiment discloses a CC treat scheme, illustrated by FIG. 7D2, that constructs a CC path of the pattern S|C|C to connect $q'_0 = (q_0, 0)$ and $q'_f = (q_f, 0)$ in (11). In particular, the proposed CC path includes 1. S: a backward line segment that starts from $q_0$ 701d and ends at a configuration $q_1 = (x^*, 0, 0, 0)$ 702d, with $-\varepsilon \le x^* < 0$;
2. $CT_1$: a forward left CT with a deflection $\delta_1$ that starts from $q_1$ 702d and ends at a configuration $q_2 = (x_1, y_1, \delta_1, 0)$ 703d;
3. $CT_2$: a backward right CT with a deflection $\delta_2 = \theta_1 + \theta_2 - \delta_1$ that starts from $q_2$ 703d and ends at $q_f$ 799d.

Given a fixed $\sigma_{max}$, the following procedure can be employed to determine transition parameters $x^*$, $x_1$, $y_1$, $\delta_1$ and $\delta_2$. Please refer to FIG. 7D2 for illustration.

1. With $CT_2$ ending at $q_f$, given by (11), we have coordinates of a center of $C_r^+(q_f)$ 716d as $\Omega_2 = (x_{\Omega_2}, y_{\Omega_2})$.
2. With $CT_1$ starting at $q_1$, a center $\Omega_1(x^*)$ of CC circle $C_l^+(q_1)$ 715d is given by a vector-valued function of $x^*$.
3. Based on $\mu$-tangency conditions, CC Circles $C_l^+(q_1)$ 715d and $C_r^+(q_f)$ 716d must be $\mu$-intersecting. That is, $x^*$ shall ensure $P\Omega_1(x^*) - \Omega_2 P = 2R_\Omega \cos\mu, -\varepsilon \le x^* < 0.$ \hfill (12)

4. Given $x^*$ solved from (12), $\Omega_1 = (x_{\Omega_1}, y_{\Omega_1})$ can be determined. Compute the auxiliary angle $\alpha$ as follows:

$$\alpha = \arctan\left(\frac{y_{\Omega_2} - y_{\Omega_1}}{x_{\Omega_2} - x_{\Omega_1}}\right).$$

The deflections of $CT_1$ and $CT_2$ are given by $\delta_1 = \alpha + \pi/2$, and $\delta_2 = \theta_1 + \theta_2 - \delta_1$, respectively; whereas the length of the line segment is given by $|x^*|$.

Similar to the CC treat scheme dealing with a CC DCJ, a continuous curvature C|C|S path pattern can also be employed as an alternation of the previously established S|C|C path to treat a C|C DCJ.

The aforementioned computation procedure of the S|C|C can be summarized in a CCP-C|C method in FIG. 7D3.

The inputs of the CCP-C|C algorithm include $q_0$, $q_f$ and $\varepsilon$. Intuitively, the CCP-C|C algorithm determines $x^*$ iteratively such that it solves (12). Towards this end, the CCP-C|C first computes $R_\Omega$ and $\mu$ with respect to $\sigma_{max}^k = \sigma_{max}^0 + k\Delta\sigma$ at the k-th iteration step (Lines 3 to 4). Next, the center $\Omega_2$ of $C_r^+(q_f)$ is obtained (Line 5). In addition, the center $\Omega_1$ of $C_l^+(q_1)$ can be computed based on the center $\Omega_0$ of $C_l^+(q_0)$ (Lines 6-7). Facing the coordinates of $\Omega_1$, (12) can then be reduced to the equation presented in Line 8 of the CCP-C|C algorithm. Solving this equation yields a valuation of $x^*$; and the value of $x^*$ can be accepted whenever $|x^*| < \varepsilon$ is satisfied before the iteration terminates (Lines 9-12). Afterwards, the desired $P_{CC}$ can be computed in terms of $x^*$ accordingly.

FIG. 7D4 plots a solution of C|C treat scheme for an example.

Figure 8A:
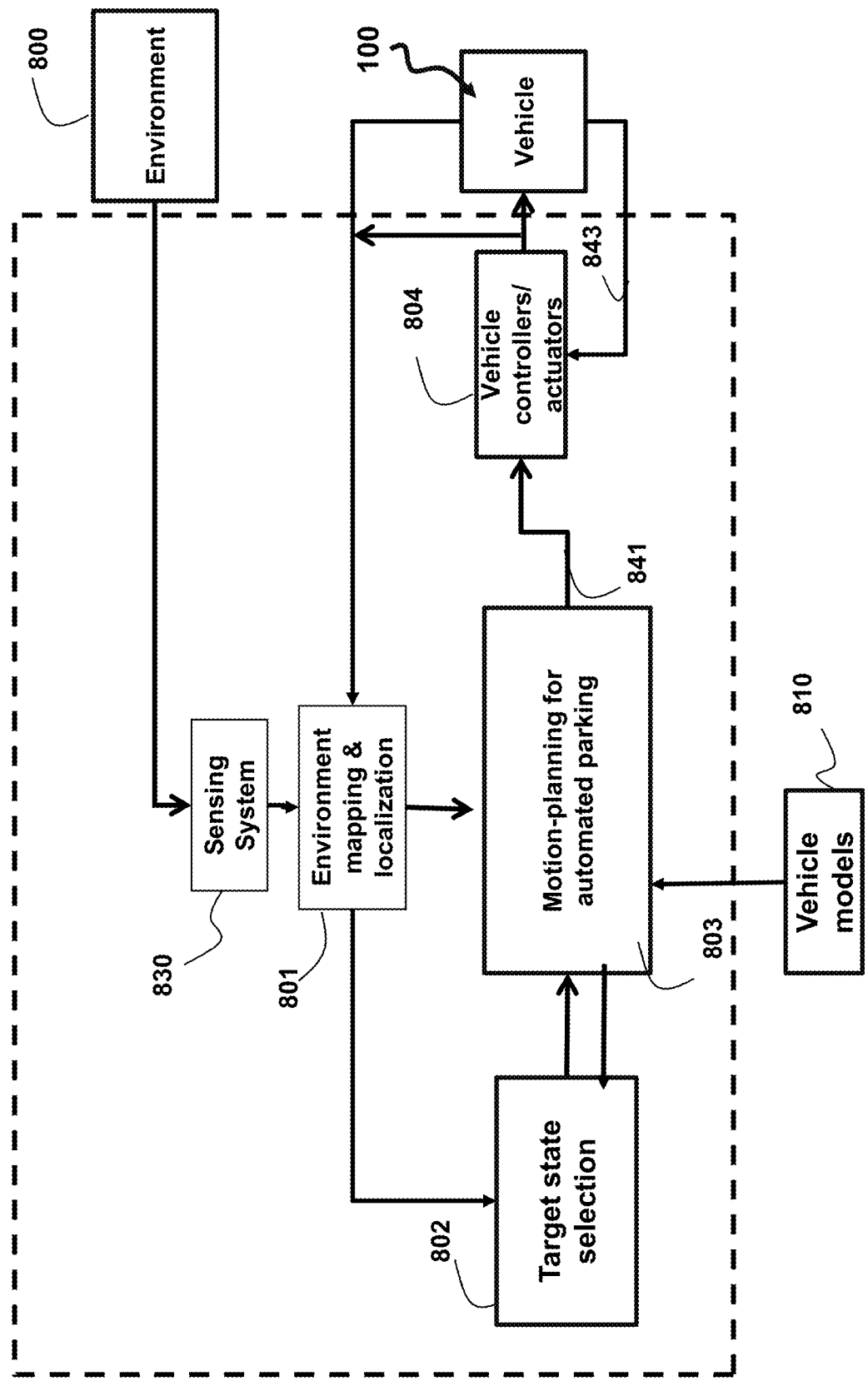
FIG. 8A shows a function diagram of an automated parking system according to one embodiment.

FIG. 8A shows a function diagram of an automated parking system according to one embodiment. Environment mapping and localization block 801 constructs or updates a map of a parking space, and determines the current location of the vehicle by sensing the environment and vehicle operation condition. For example, an inertial measurement unit, which may include 3-axis accelerometer(s), 3-axis gyroscope(s), and/or magnetometer(s), can be used to sense the vehicle operation. A global positioning system sensor can be used to provide position and velocity of the vehicle. Sensors to sense the environment 500 can be video cameras capturing obstacles including other vehicles, pedestrians, and buildings, ultrasonic/radar sensors detecting distance between the vehicle and obstacles, etc. Final state selection block 801 selects a final state for a parking spot to park the vehicle by identifying parking lot candidates, and sends the final state to a motion planning block 803. In one embodiment, the available parking spots are tracked by a separate system associated with the management of the parking garage.

Additionally, or alternatively, the parking spots can be detected using the sensors 803 of the automated parking system. In one embodiment, the motion planning block checks to determine whether the final state is parkable, i.e., there is a feasible path to the parking spot, or not, and notifies the final state selection block 802 the check result. If the final state is not parkable, the target selection block 802 selects another final state for evaluation. In another embodiment, the final state selection block 501 can also evaluate whether the final state is parkable, and only sends a parkable final state to the motion planning block.

If the final state is parkable, then the motion planning 803 initiates a complete motion planning procedure to determine a reference trajectory 841 based on the vehicle models 810, the initial and final states of the vehicle, and the map of the parking space. In one embodiment, the reference trajectory defines profiles of the vehicle velocity and steer angle over time. In another embodiment, the reference trajectory defines the profile of the vehicle state over time.

Given the reference trajectory 841, vehicle controllers and actuators 804 determine and exert control commands to enforce the vehicle state track the reference trajectory 841 if the reference trajectory is state profile, or to enforce the vehicle velocity and steer angle track the reference trajectory if the reference trajectory is the vehicle velocity and steer angle profiles. In one embodiment, the control commands could be gas pedal pressure or steering torque. The vehicle controller/actuators may also use signal 843 to determine control commands. The signal 843 can be a measured steering angle, or measured currents of motors moving the steering wheel or the gas pedal.

Figure 8B:
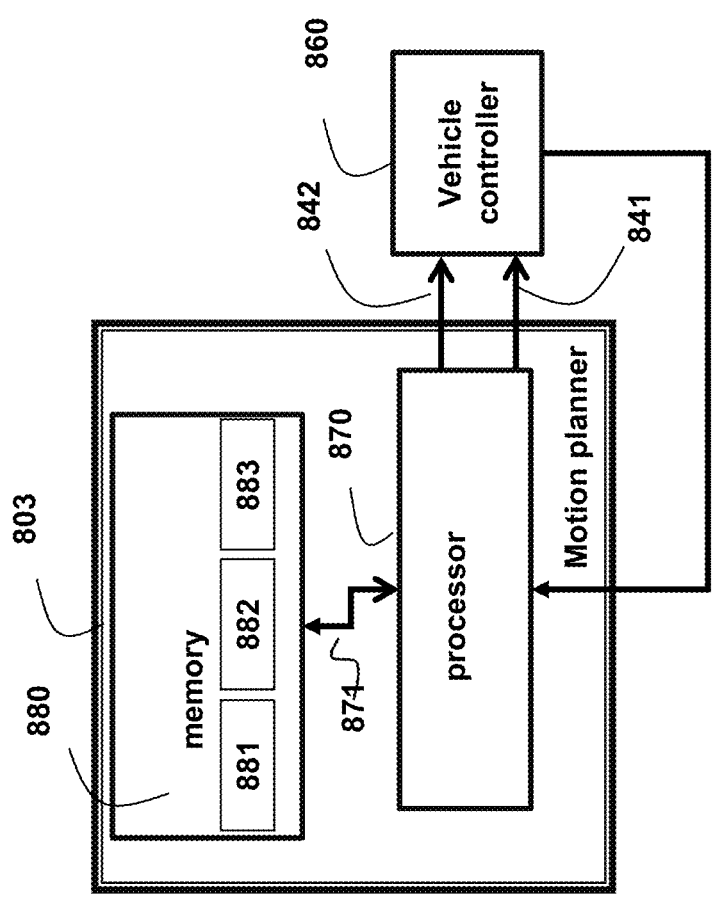
FIG. 8B shows a general structure of the motion-planning system according to one embodiment.

FIG. 8B shows a general structure of the motion-planning system 803 according to one embodiment. The motion-planning system 803 includes at least one processor 870 for executing modules of the motion-planning system 803. The processor 870 is connected 871 to a memory 880 that stores geometrical information 881 such as geometry of the vehicle and a map of the parking space. The memory 880 can also store the models of the vehicle 882 such as a kinematic model of the vehicle and a dynamic model of the vehicle. The memory 880 can also store the internal information 883 of the motion planner, including, but not limited to, an initial state of the vehicle, a final state of parked vehicle, cost function, values of each computed state, pre-computed clothoid and its deflection angle and deflection for a set of pairs of σ, radius of a CC circle, the motion leading up to each state, a kinematic graph, reference trajectory. In some embodiments, the memory 880 can include stored instructions implementing the method for the automated parking, wherein the instructions, when executed by the processor 870 carry out at least some steps of the method.

Figure 9:
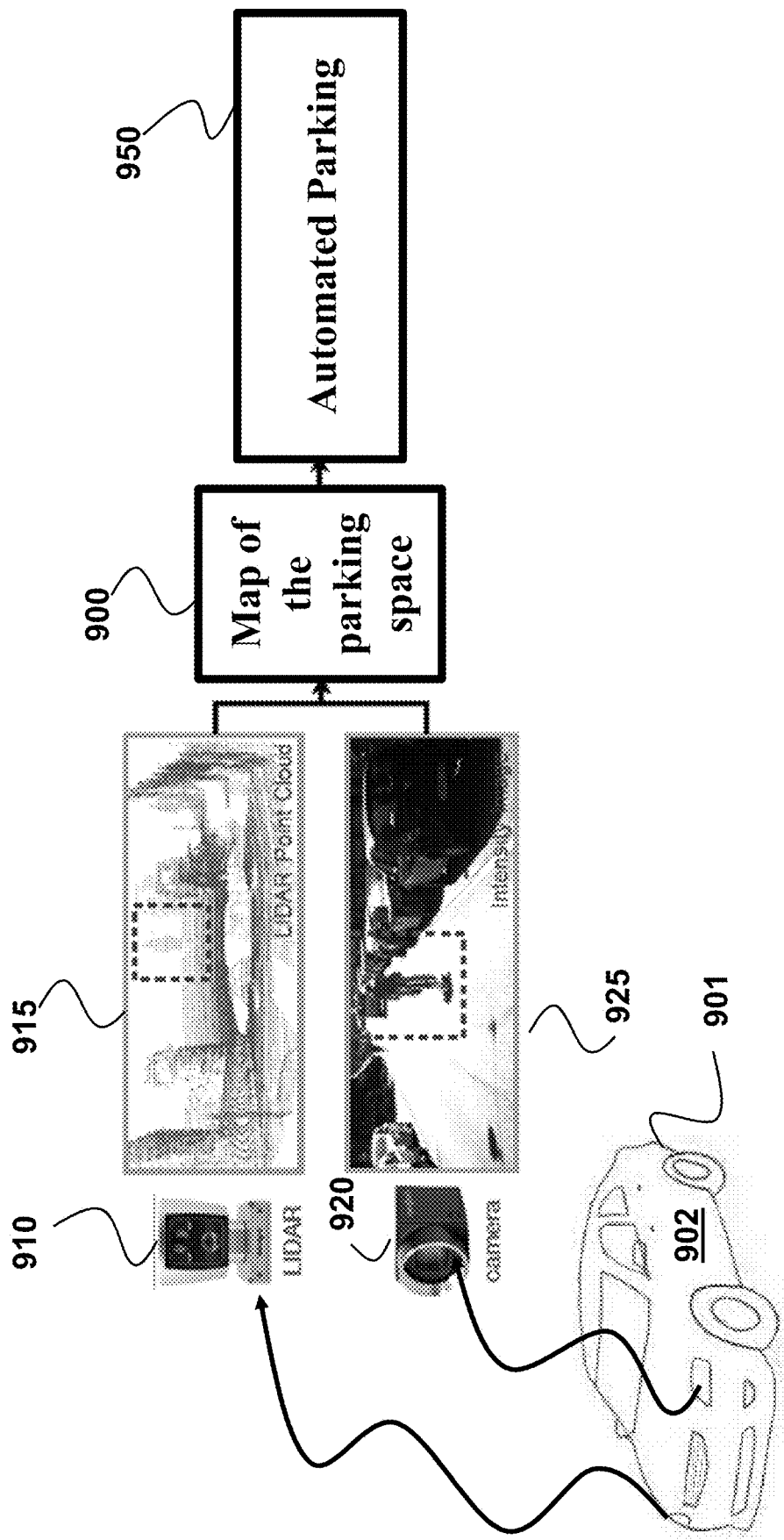
FIG. 9 shows a schematic of a system according to one embodiment.

FIG. 9 shows a schematic of a system according to one embodiment. The system include a vehicle 901 including a processor 902 configured for performing an automated parking 950. The vehicle also includes at least one sensor, such as a LIDAR 910 and/or a camera 920. The LIDAR sensor 910 is the low-resolution first sensor and the camera 920 is the high-resolution second sensor. The sensor 910 and/or 920 is operatively connected to the processor 902 and is configured for sensing information indicative of the geometry of at least part of the parking space. Using this information, the processor 902 determines and/or updates the map of the parking space 900. To that end, the processor 902 performs the automated parking 950 using the map 900.

Figure 10:
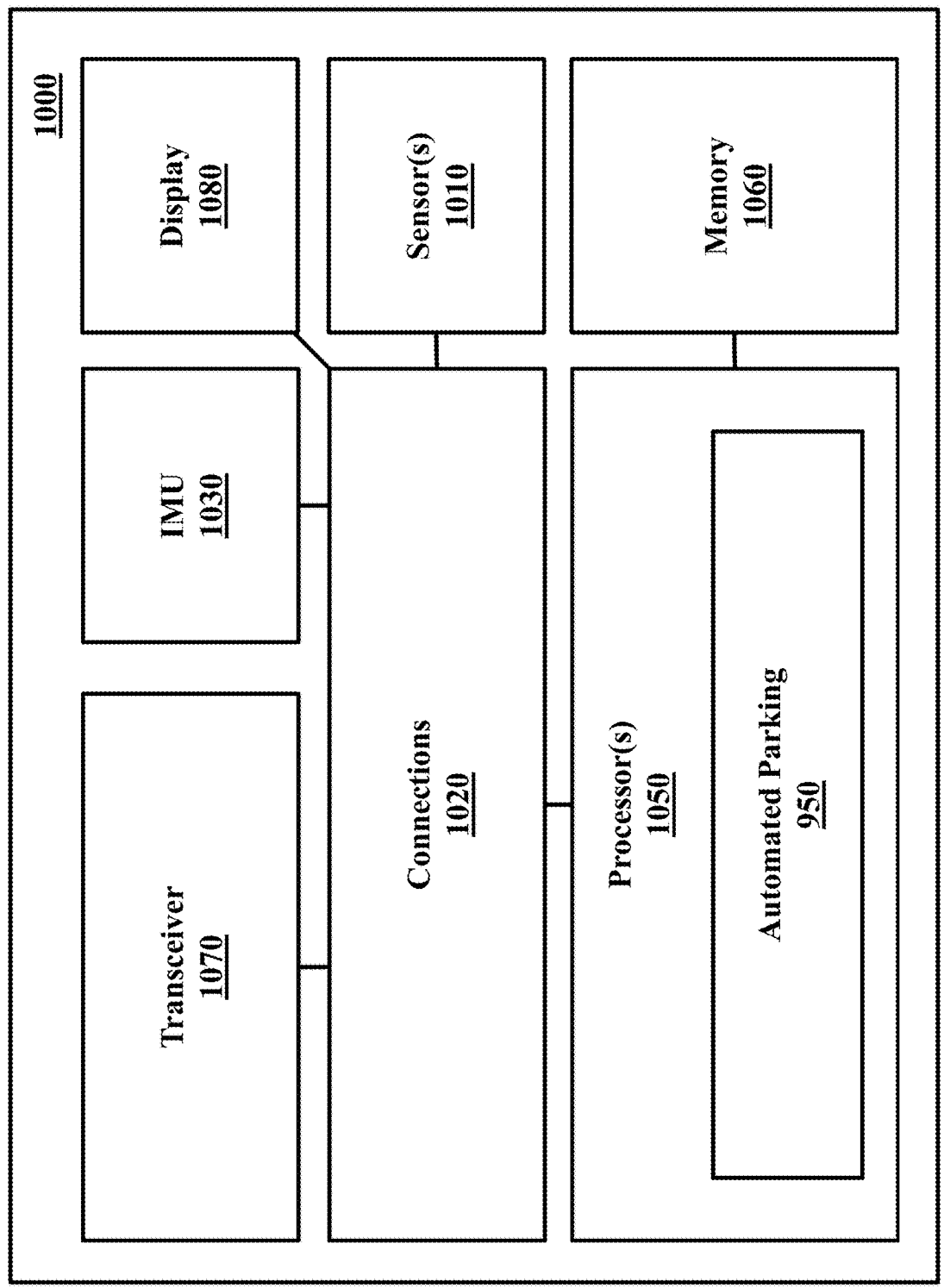
FIG. 10 shows a block diagram of an automated parking system according to some embodiments.

FIG. 10 shows a block diagram of an automated parking system 1000 according to some embodiments. The system 1000 can be implemented internal to the vehicle 901. Additionally, or alternatively, the system 1000 can be communicatively connected to the vehicle 901.

The system 1000 can include one or combination of a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 400 can also include one or more ports for communicating over wired networks.

In some embodiments, the system 1000 can comprise image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 1010 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 can include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 1010. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion can be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 400 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking.

For example, the memory 1060 can store the measurements of the sensors, such as still images, depth information, video frames, program results, as well as data provided by the IMU 1030 and other sensors. The memory 1060 can store a memory storing a geometry of the vehicle, a map of the parking space, a kinematic model of the vehicle, and a dynamic model of the vehicle. In general, the memory 1060 can represent any data storage mechanism. The memory 1060 can include, for example, a primary memory and/or a secondary memory. The primary memory can include, for example, a random access memory, read only memory, etc. While illustrated in FIG. 4 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for controlling a motion of a vehicle from an initial state to a target state, comprising:
   a path planner to determine a discontinuous curvature path connecting the initial state with the target state by a sequential composition of driving patterns, wherein the discontinuous curvature path is collision-free within a tolerance envelope centered on the discontinuous curvature path;
   a path transformer to locate and replace at least one treatable primitive in the discontinuous curvature path with a corresponding continuous curvature segment to form a modified path remaining within the tolerance envelope, wherein each treatable primitive is a predetermined pattern of elementary paths, wherein the treatable primitive includes at least one of a sequence of a straight-line segment connected to a first arc segment connected to a second arc segment, and a sequence of a first arc segment connected to a second arc segment connected to a straight-line segment, and wherein the path transformer replace the treatable primitive with a pair of clothoid turns; and
   a controller to control the motion of the vehicle according to the modified path.

2. The system of claim 1, wherein the path planner is a Reeds-Shepp (RS) path planner forming the discontinuous curvature path using a combination of a straight-line segment and a circular arc tangentially connected at discontinuous curvature junctions, further comprising:
   a converter to convert the sequential composition of driving patterns into a sequence of treatable primitives.

3. The system of claim 2, wherein the converter converts each RS driving pattern independently from each other.

4. The system of claim 2, wherein the converter inserts a new elementary path in the sequential composition of RS driving patterns or splits at least one existing elementary path in the sequential composition of RS driving patterns to modify the sequential composition and partition the modified sequential composition of RS driving patterns into a sequence of treatable primitives.

5. The system of claim 2, wherein the converter iteratively tests each tuple of elementary paths forming the discontinuous curvature path for being a treatable primitive and inserts a new straight-line segment staying inside the envelope of the discontinuous curvature path into a tuple not representing the treatable primitive.

6. The system of claim 5, wherein the converter inserts the new straight-line segment in the front of the tuple or after the second elementary path of the tuple.

7. The system of claim 1, wherein the path planner imposes a constraint on the discontinuous curvature path requiring at least one of an initial and a final segment of the discontinuous curvature path being a straight-line segment, such that the discontinuous curvature path is a sequence of the treatable primitives.

8. The system of claim 1, wherein the path transformer replaces a sequence of an even number of circular arc segments connected to the straight-line segment with a sequence of the even number of clothoid turns.

9. The system of claim 8, further comprising:
   a converter to split a circular arc of the discontinuous curvature path to convert a sequence of an odd number of circular arc segments into the sequence of the even number of circular arc segments.

10. The system of claim 1, wherein the path transformer determines parameters of the continuous curvature segment to satisfy a $\mu$-tangency constraint and remain in the envelope of the discontinuous curvature path.

11. A method for controlling a motion of a vehicle from an initial state to a target state, wherein the method uses a processor coupled with stored instructions implementing the method, wherein the instructions, when executed by the processor carry out at least some steps of the method, comprising:
   determining a discontinuous curvature path connecting the initial state with the target state by a sequential composition of driving patterns, wherein the discontinuous curvature path is collision-free within a tolerance envelope centered on the discontinuous curvature path, wherein the determining imposes a constraint on the discontinuous curvature path requiring at least one of an initial and a final segment of the discontinuous curvature path being a straight-line segment, such that the discontinuous curvature path is a sequence of the treatable primitives;
   locating and replacing at least one treatable primitive in the discontinuous curvature path with a corresponding continuous curvature segment to form a modified path remaining within the tolerance envelope, wherein each treatable primitive is a predetermined pattern of elementary paths; and
   controlling the motion of the vehicle according to the modified path.

12. The method of claim 11, wherein the path planner is a Reeds-Shepp (RS) path planner forming the discontinuous curvature path using a combination of a straight-line segment and a circular arc tangentially connected at discontinuous curvature junctions, further comprising:
   converting the sequential composition of driving patterns into a sequence of treatable primitives.

13. A non-transitory computer readable storage medium embodied thereon a program executable by a processor for performing a method, the method comprising:

determining a discontinuous curvature path connecting the initial state with the target state by a sequential composition of driving patterns, wherein the discontinuous curvature path is collision-free within a tolerance envelope centered on the discontinuous curvature path, wherein the determining imposes a constraint on the discontinuous curvature path requiring at least one of an initial and a final segment of the discontinuous curvature path being a straight-line segment, such that the discontinuous curvature path is a sequence of the treatable primitives;

locating and replacing at least one treatable primitive in the discontinuous curvature path with a corresponding continuous curvature segment to form a modified path remaining within the tolerance envelope, wherein each treatable primitive is a predetermined pattern of elementary paths; and controlling the motion of the vehicle according to the modified path.

14. A system for controlling a motion of a vehicle from an initial state to a target state, comprising:

a path planner to determine a discontinuous curvature path connecting the initial state with the target state by a sequential composition of driving patterns, wherein the discontinuous curvature path is collision-free within a tolerance envelope centered on the discontinuous curvature path, wherein the path planner is a Reeds-Shepp (RS) path planner forming the discontinuous curvature path using a combination of a straight-line segment and a circular arc tangentially connected at discontinuous curvature junctions;

a converter to convert the sequential composition of driving patterns into a sequence of treatable primitives, wherein the converter converts each RS driving pattern independently from each other;

a path transformer to locate and replace at least one treatable primitive in the discontinuous curvature path with a corresponding continuous curvature segment to form a modified path remaining within the tolerance envelope, wherein each treatable primitive is a predetermined pattern of elementary paths; and a controller to control the motion of the vehicle according to the modified path.

15. A system for controlling a motion of a vehicle from an initial state to a target state, comprising:

a path planner to determine a discontinuous curvature path connecting the initial state with the target state by a sequential composition of driving patterns, wherein the discontinuous curvature path is collision-free within a tolerance envelope centered on the discontinuous curvature path, wherein the path planner is a Reeds-Shepp (RS) path planner forming the discontinuous curvature path using a combination of a straight-line segment and a circular arc tangentially connected at discontinuous curvature junctions;

a converter to convert the sequential composition of driving patterns into a sequence of treatable primitives, wherein the converter inserts a new elementary path in the sequential composition of RS driving patterns or splits at least one existing elementary path in the sequential composition of RS driving patterns to modify the sequential composition and partition the modified sequential composition of RS driving patterns into a sequence of treatable primitives;

a path transformer to locate and replace at least one treatable primitive in the discontinuous curvature path with a corresponding continuous curvature segment to form a modified path remaining within the tolerance envelope, wherein each treatable primitive is a predetermined pattern of elementary paths; and a controller to control the motion of the vehicle according to the modified path.

16. A system for controlling a motion of a vehicle from an initial state to a target state, comprising:

a path planner to determine a discontinuous curvature path connecting the initial state with the target state by a sequential composition of driving patterns, wherein the discontinuous curvature path is collision-free within a tolerance envelope centered on the discontinuous curvature path, wherein the path planner is a Reeds-Shepp (RS) path planner forming the discontinuous curvature path using a combination of a straight-line segment and a circular arc tangentially connected at discontinuous curvature junctions;

a converter to convert the sequential composition of driving patterns into a sequence of treatable primitives, wherein the converter iteratively tests each tuple of elementary paths forming the discontinuous curvature path for being a treatable primitive and inserts a new straight-line segment staying inside the envelope of the discontinuous curvature path into a tuple not representing the treatable primitive;

a path transformer to locate and replace at least one treatable primitive in the discontinuous curvature path with a corresponding continuous curvature segment to form a modified path remaining within the tolerance envelope, wherein each treatable primitive is a predetermined pattern of elementary paths; and a controller to control the motion of the vehicle according to the modified path.

* * * * *